(12) United States Patent
Jassal et al.

(10) Patent No.: US 11,856,415 B2
(45) Date of Patent: Dec. 26, 2023

(54) METHOD, APPARATUS, AND SYSTEM UTILIZING LOWER LAYER SIGNALLING FOR MOBILITY BEAM MANAGEMENT

(71) Applicants: Aman Jassal, Stittsville (CA); Xi Zhang, Kanata (CA)

(72) Inventors: Aman Jassal, Stittsville (CA); Xi Zhang, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 118 days.

(21) Appl. No.: 17/318,469

(22) Filed: May 12, 2021

(65) Prior Publication Data
US 2021/0360436 A1 Nov. 18, 2021

Related U.S. Application Data

(60) Provisional application No. 63/025,408, filed on May 15, 2020.

(51) Int. Cl.
*H04W 16/28* (2009.01)
*H04W 24/08* (2009.01)
(Continued)

(52) U.S. Cl.
CPC .......... *H04W 16/28* (2013.01); *H04W 24/08* (2013.01); *H04W 24/10* (2013.01); *H04W 80/02* (2013.01)

(58) Field of Classification Search
CPC ..... H04W 76/19; H04W 76/27; H04W 24/08; H04W 4/08; H04W 4/06; H04W 36/36;
(Continued)

(56) References Cited

U.S. PATENT DOCUMENTS 8,605,752 B2\* 12/2013 Kanada ................ H04L 47/323
370/474
9,247,575 B2\* 1/2016 Rayavarapu .......... H04W 76/19
(Continued)

FOREIGN PATENT DOCUMENTS

CN 108781103 A 11/2018
CN 110036677 A 7/2019
(Continued)

OTHER PUBLICATIONS

E. Gures, I. Shayea, A. Alhammadi, M. Ergen and H. Mohamad, "A Comprehensive Survey on Mobility Management in 5G Heterogeneous Networks: Architectures, Challenges and Solutions," in IEEE Access, vol. 8, pp. 195883-195913, 2020, doi: 10.1109/ACCESS.2020.3030762. (Year: 2020).\*
(Continued)

*Primary Examiner* — William D Cumming

(57) ABSTRACT

Methods and devices are provided that use lower-layer signalling, for example Layer 1 (L1) and/or Layer 2 (L2), as a part of mobility beam management. A method for performing inter-cell mobility management may include receiving, by a user equipment (UE) from a network, higher-layer signaling that includes configuration information for a plurality of mobility beam management reference signals (MBM-RSs) enabling the UE to measure MBM-RSs transmitted by at least one base station in the network. In addition the UE may receive from the network, lower-layer signaling include additional information relating to monitoring for a mobility beam MBM event.

20 Claims, 30 Drawing Sheets

(51) Int. Cl.
*H04W 24/10* (2009.01)
*H04W 80/02* (2009.01)

(58) Field of Classification Search
CPC ... H04W 72/54; H04W 72/23; H04W 72/541; H04W 72/30; H04L 41/0813
USPC ...... 455/422.1, 509; 370/474, 329, 241, 312
See application file for complete search history.

(56) References Cited

U.S. PATENT DOCUMENTS

| | | | | |
|---|---|---|---|---|
| 10,080,218 | B2* | 9/2018 | Yi | H04W 72/54 |
| 10,469,551 | B2* | 11/2019 | Draznin | H04L 65/611 |
| 10,582,484 | B2* | 3/2020 | Yi | H04W 4/06 |
| 11,064,406 | B2* | 7/2021 | Tidestav | H04W 24/10 |
| 11,297,467 | B2* | 4/2022 | Zisimopoulos | H04W 4/06 |
| 2012/0243458 | A1* | 9/2012 | Ai | H04W 72/30 |
| | | | | 370/312 |
| 2013/0260740 | A1* | 10/2013 | Rayavarapu | H04W 76/27 |
| | | | | 455/422.1 |
| 2013/0260810 | A1* | 10/2013 | Rayavarapu | H04W 76/19 |
| | | | | 455/509 |
| 2013/0260811 | A1* | 10/2013 | Rayavarapu | H04W 76/19 |
| | | | | 455/509 |
| 2014/0286258 | A1* | 9/2014 | Chowdhury | H04L 69/16 |
| | | | | 370/329 |
| 2014/0301210 | A1* | 10/2014 | Kim | H04W 24/08 |
| | | | | 370/241 |
| 2016/0094352 | A1* | 3/2016 | Thiruvenkatachari | H04L 1/22 |
| | | | | 370/312 |
| 2017/0013423 | A1* | 1/2017 | Zisimopoulos | H04L 12/189 |
| 2017/0041643 | A1* | 2/2017 | Yamagishi | H04L 65/762 |
| 2017/0070312 | A1* | 3/2017 | Yi | H04W 72/541 |
| 2017/0223667 | A1* | 8/2017 | Yi | H04W 72/23 |
| 2017/0310721 | A1* | 10/2017 | Draznin | H04L 65/611 |
| 2019/0007933 | A1* | 1/2019 | Yi | H04W 4/06 |
| 2019/0246322 | A1* | 8/2019 | Ronkainen | H04W 36/36 |
| 2019/0281420 | A1* | 9/2019 | Zisimopoulos | H04W 4/06 |
| 2020/0029262 | A1 | 1/2020 | Kim et al. | |
| 2021/0028984 | A1* | 1/2021 | Da Silva | H04W 24/10 |
| 2021/0144600 | A1* | 5/2021 | Tidestav | H04W 24/10 |
| 2021/0360436 | A1* | 11/2021 | Jassal | H04W 36/085 |

FOREIGN PATENT DOCUMENTS

| | | | | |
|---|---|---|---|---|
| WO | WO-2017053756 | A1* | 3/2017 | H04B 17/24 |
| WO | 2018059711 | A1 | 4/2018 | |
| WO | WO-2018059711 | A1* | 4/2018 | H04L 5/0048 |
| WO | 2018232090 | A1 | 12/2018 | |
| WO | 2019030725 | A1 | 2/2019 | |
| WO | 2019159096 | A1 | 8/2019 | |
| WO | WO-2019159096 | A1* | 8/2019 | H04L 41/0813 |

OTHER PUBLICATIONS

M. Tayyab, X. Gelabert and R. Jäntti, "A Survey on Handover Management: From LTE to NR," in IEEE Access, vol. 7, pp. 118907-118930, 2019, doi: 10.1109/ACCESS.2019.2937405. (Year: 2019).*

3GPP TSG RAN WG1 Meeting 90bis, R1-1717605, "On Beam Management, Measurement and Reporting", Samsung, Prague, CZ, Oct. 9 -13, 2017, total 16 pages.

"3rd Generation Partnership Project; Technical Specification Group Radio Access Network; NR; Physical layer procedures for control" (Release 15), Technical Specification, 3GPP TS 38.213 V15.9.0, Mar. 2020, 110 pages.

"3rd Generation Partnership Project; Technical Specification Group Radio Access Network; NR; Medium Access Control (MAC) protocol specification" (Release 15), Technical Specification, 3GPP TS 38.321 V15.8.0, Dec. 2019, 78 pages.

"3rd Generation Partnership Project; Technical Specification Group Radio Access Network; NR; Radio Resource Control (RRC) protocol specification" (Release 15), Technical Specification, 3GPP TS 38.331 V15.8.0, Dec. 2019, 532 pages.

* cited by examiner

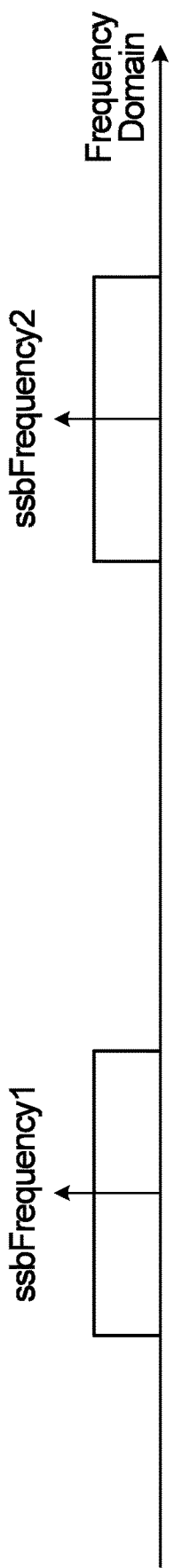
FIG. 1A
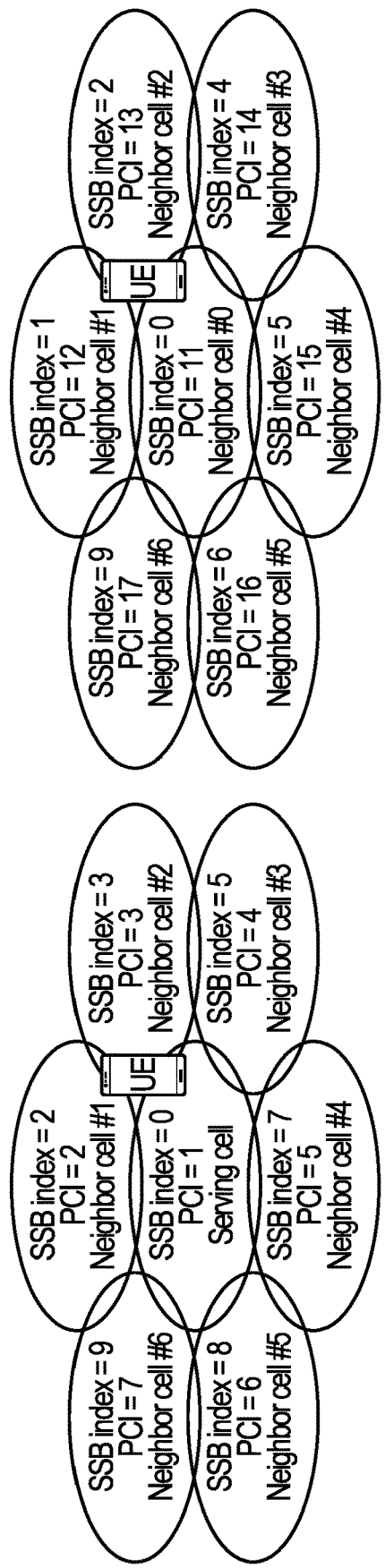
FIG. 1B
FIG. 1C

```
1> CSI-MeasConfig
 2> nzp-CSI-RS-ResourceToAddModList
  3> nzp-CSI-RS-Resources
   4> nzp-CSI-RS-ResourceId = 1
   4> scramblingId = 9
   4> resourceMapping
    5> freqBand
     6> startingRB = 4
     6> numberofRBs = 48
   4> nzp-CSI-RS-ResourceId = 2
   4> scramblingId = 9
   4> resourceMapping
    5> freqBand
     6> startingRB = 54
     6> numberofRBs = 48
```

```
1> CSI-MeasConfig
 2> nzp-CSI-RS-ResourceToAddModList
  3> nzp-CSI-RS-Resources
   4> nzp-CSI-RS-ResourceId = 3
   4> scramblingId = 9
   4> resourceMapping
    5> freqBand
     6> startingRB = 104
     6> numberofRBs = 48
   4> nzp-CSI-RS-ResourceId = 4
   4> scramblingId = 9
   4> resourceMapping
    5> freqBand
     6> startingRB = 154
     6> numberofRBs = 48
```

FIG. 4B

| Freq. Resource Reconfiguration field | Starting RB | RS bandwidth |
|---|---|---|
| 0 | 10 | 24 |
| 1 | 70 | 24 |
| 2 | 130 | 24 |
| 3 | 190 | 24 |
| 4 | 10 | 48 |
| 5 | 110 | 48 |
| 6 | 210 | 48 |
| ... | ... | |
| 60 | 10 | 192 |
| 61 | 50 | 192 |
| 62 | 10 | 240 |
| 63 | Reserved | |

FIG. 4C

| Time Resource Reconfig. field | firstOFDMSymbolInTimeDomain | slotPeriodicity | slotOffset |
|---|---|---|---|
| 0 | 0 | 4 | 0 |
| 1 | 0 | 4 | 2 |
| 2 | 0 | 5 | 0 |
| 3 | 0 | 5 | 2 |
| 4 | 0 | 10 | 0 |
| 5 | 0 | 10 | 5 |
| 6 | 0 | 40 | 0 |
| ... | | ... | |
| 60 | 1 | 640 | 160 |
| 61 | 1 | 640 | 320 |
| 62 | 1 | 640 | 480 |
| 63 | | Reserved | |

FIG. 4D

```
1> CSI-MeasConfig
 2> nzp-CSI-RS-ResourceToAddModList
  3> nzp-CSI-RS-Resources
   4> nzp-CSI-RS-ResourceId = 1
   4> scramblingId = 57
   4> periodicityAndOffset
    5> slot5 = 0
   5> firstOfdmSymbol = 0
   4> resourceMapping
    5> freqBand
     6> startingRB = 10
     6> numberofRBs = 24
   4> nzp-CSI-RS-ResourceId = 2
   4> scramblingId = 57
   4> periodicityAndOffset
    5> slot5 = 0
   5> firstOfdmSymbol = 0
   4> resourceMapping
    5> freqBand
     6> startingRB = 70
     6> numberofRBs = 24
```

```
1> CSI-MeasConfig
 2> nzp-CSI-RS-ResourceToAddModList
  3> nzp-CSI-RS-Resources
   4> nzp-CSI-RS-ResourceId = 3
   4> scramblingId = 57
   4> periodicityAndOffset
    5> slot5 = 0
   5> firstOfdmSymbol = 0
   4> resourceMapping
    5> freqBand
     6> startingRB = 130
     6> numberofRBs = 24
   4> nzp-CSI-RS-ResourceId = 4
   4> scramblingId = 57
   4> periodicityAndOffset
    5> slot5 = 0
   5> firstOfdmSymbol = 0
   4> resourceMapping
    5> freqBand
     6> startingRB = 190
     6> numberofRBs = 24
```

FIG. 4G

```
1> CSI-MeasConfig
 2> nzp-CSI-RS-ResourceToAddModList
  3> nzp-CSI-RS-Resources
   4> nzp-CSI-RS-ResourceId = 1
   4> scramblingId = 9
   4> resourceMapping
    5> freqBand
     6> startingRB = 4
     6> numberofRBs = 48
   4> nzp-CSI-RS-ResourceId = 2
   4> scramblingId = 9
   4> resourceMapping
    5> freqBand
     6> startingRB = 54
     6> numberofRBs = 48
   4> nzp-CSI-RS-ResourceId = 3     ⎫
   4> scramblingId = 9               ⎬ 510
   4> resourceMapping                ⎭
    5> freqBand
     6> startingRB = 104
     6> numberofRBs = 48
   4> nzp-CSI-RS-ResourceId = 4     ⎫
   4> scramblingId = 9               ⎬ 515
   4> resourceMapping                ⎭
    5> freqBand
     6> startingRB = 154
     6> numberofRBs = 48
```

```
1> CSI-MeasConfig
 2> nzp-CSI-RS-ResourceToAddModList
  3> nzp-CSI-RS-Resources
   4> nzp-CSI-RS-ResourceId = 1
   4> scramblingId = 57
   4> resourceMapping
    5> freqBand
     6> startingRB = 4
     6> numberofRBs = 24
   4> nzp-CSI-RS-ResourceId = 2     ⎫
   4> scramblingId = 57              ⎬ 520
   4> resourceMapping                ⎭
    5> freqBand
     6> startingRB = 54
     6> numberofRBs = 24
   4> nzp-CSI-RS-ResourceId = 3     ⎫
   4> scramblingId = 57              ⎬ 525
   4> resourceMapping                ⎭
    5> freqBand
     6> startingRB = 104
     6> numberofRBs = 24
   4> nzp-CSI-RS-ResourceId = 4
   4> scramblingId = 57
   4> resourceMapping
    5> freqBand
     6> startingRB = 154
     6> numberofRBs = 24
```

FIG. 5A

```
1> CSI-ReportConfig
   2> reportConfigId = 1
   2> reportConfigType
      3> event-MBM1
         4> resource1
            5> nzp-CSI-RS-ResourceId = 2
            5> scramblingId = 57
         4> resource2
            5> nzp-CSI-RS-ResourceId = 3
            5> scramblingId = 9
         4> measQuantity = RSRP
         4> threshold-dB = 3
         4> duration-ms = 20
```

FIG. 5B

```
1> CSI-ReportConfig
   2> reportConfigId = 1
   2> reportConfigType
      3> event-MBM1
         4> resource1
            5> nzp-CSI-RS-ResourceId = 3
            5> scramblingId = 57
         4> resource2
            5> nzp-CSI-RS-ResourceId = 4
            5> scramblingId = 9
         4> measQuantity = RSRP
         4> threshold-dB = 3
         4> duration-ms = 20
```

| Scrambling Identity = 57 | CSI-RS index = 2 | Scrambling identity = 9 | CSI-RS index = 4 | Scrambling identity = 57 | CSI-RS index = 3 |
|---|---|---|---|---|---|
| 635 | 630 | 625 | 620 | 615 | 610 |

| Scrambling Identity = 9 | CSI-RS index = 2 | CSI-RS weight = 2 | Scrambling identity = 57 | CSI-RS index = 3 | CSI-RS weight = 1 | Scrambling identity = 57 | CSI-RS index = 4 | CSI-RS weight = 4 | Scrambling identity = 9 | CSI-RS index = 1 | CSI-RS weight = 2 | Scrambling identity = 57 | CSI-RS index = 2 | CSI-RS weight = 4 | CSI-RS weight = 1 | Scrambling identity = 9 | CSI-RS index = 3 | Scrambling identity = 9 | CSI-RS index = 4 | CSI-RS weight = 3 | CSI-RS index = 1 | CSI-RS weight = 3 | Scrambling identity = 57 |

650  670  665  660  655

```
1> MIB
    2> PUCCH-ConfigMBM
        3> PUCCHResourceSetZero = 0
        3> PUCCHResourceZero = 0
        3> PUCCH-PowerControl = 8
        3> PUCCH-Format = 4
```

FIG. 7A

```
1> MIB
    2> PUCCH-ConfigMBM
        3> PUCCHResourceSetZero = 0
        3> PUCCHResourceZero = 32
        3> PUCCH-PowerControl = 15
        3> PUCCH-Format = 4
```

FIG. 7B

| UL resource reconfig. | PUCCHResource SetZero | PUCCHResource | PUCCH-PowerControl | PUCCH-NrOfSlots | PUCCH-Format |
|---|---|---|---|---|---|
| 0 | 0 | 0 | 8 | 2 | 4 |
| 1 | 0 | 0 | 8 | 4 | 4 |
| 2 | 0 | 32 | 15 | 4 | 4 |
| 3 | 0 | 64 | 15 | 4 | 4 |
| ... | | | | | |
| 61 | 3 | 0 | 8 | 2 | 4 |
| 62 | 3 | 32 | 15 | 4 | 4 |
| 63 | 3 | 64 | 15 | 4 | 4 |

FIG. 7E

1> MIB
2> ConfigMBM
3> MobilityBeamResourceSet = 7

FIG. 10A

| MobilityBeamResourceSet | Number of RBs | Starting RB | Number of symbols |
|---|---|---|---|
| 0 | 24 | 0 | 2 |
| 1 | 24 | 0 | 4 |
| 2 | 24 | 132 | 2 |
| 3 | 24 | 132 | 4 |
| 4 | 48 | 0 | 2 |
| 5 | 48 | 0 | 4 |
| 6 | 48 | 132 | 2 |
| 7 | 48 | 132 | 4 |

FIG. 10B

METHOD, APPARATUS, AND SYSTEM UTILIZING LOWER LAYER SIGNALLING FOR MOBILITY BEAM MANAGEMENT

RELATED APPLICATIONS

This application claims priority to U.S. Provisional Application No. 63/025,408 filed on May 15, 2020, which is incorporated herein by reference in its entirety.

TECHNICAL FIELD

The present disclosure relates generally to wireless communications, and in particular embodiments, to methods and devices for mobility beam management.

BACKGROUND

In some wireless communication systems, user equipments (UEs) wirelessly communicate with a base station to send data to the base station and/or receive data from the base station. A wireless communication from a UE to a base station is referred to as an uplink (UL) communication. A wireless communication from a base station to a UE is referred to as a downlink (DL) communication.

Resources are required to perform uplink and downlink communications in such wireless communication systems. For example, a base station may wirelessly transmit data, such as a transport block (TB), using wireless signals and/or physical layer channels, to a UE in a downlink transmission at a particular frequency and over a particular duration of time. The frequency and time duration used are examples of resources.

Current methods for inter-cell mobility management in wireless communication systems (e.g. cellular systems) involve higher layer signaling based methods, such as Layer 3 (L3)-based signaling methods. Examples of L3-based signaling methods include L3-based signaling for configuring a device for measurement of reference signals and L3-based signaling for configuring a device for reporting of cell-based events.

In some wireless communication systems, beamforming is used in which a communication signal is transmitted in a particular direction instead of being transmitted omni-directionally. This beam-based approach for signal transmission may allow signal power to be focused in a particular direction with higher possibility of being detected at the destination. In some situations, a transmitter in a communication cell is able to transmit in many directions, but by using multiple separate beams. Therefore, as a receiver moves in relation the transmitter, the transmitter may use different beams to stay in contact with the receiver. As a receiver moves between beams of the transmitter in the cell or away from a transmitter and towards a neighboring transmitter in an adjacent cell, a change in signal strength perceived by the receiver, which may be considered to be an event, can result in a change from one beam to another of the transmitter or handover from the transmitter to the neighboring transmitter a Tracking of cell-based events may result in poor performance in beam-based deployments particularly with regard to latency issues.

SUMMARY

Embodiments described in this disclosure aid in addressing a problem of tracking beam-based mobility events by providing the network with methods to configure the UE with mobility beam-based (MBM) events to track. The mobility beam-based events can be reconfigured using MAC-CE commands. Furthermore, embodiments described herein illustrate methods to enable the UE to report mobility measurements for such mobility beam-based events without invoking higher-layer signaling (e.g. scheduling requests).

In some embodiments described in this disclosure, the UE is configured by the network to monitor certain mobility beam management reference signals (MBM-RSs). Without loss of generality, a UE receives various signals and channels over the course of its life-time in a wireless network. A UE may only detect a signal or a channel that it received at a given time, similarly a UE may only measure a signal or a channel that it is able to detect. In the context of this disclosure, the task of "monitoring a reference signal" means that the UE attempts to "detect and measure a reference signal". Similarly, the task of "monitoring a beam" means that the UE "attempts to detect and measure a beam". Throughout this disclosure, the terms "MBM-RS" and "beams" are used inter-changeably. If a reference signal is detected, then the UE is expected to measure that reference signal and produce a measurement result based on the type of the measurement result configured by the network, such as, for example: RSRP (Reference Signal Received Power), RSRQ (Reference Signal Received Quality) or SINR (Signal to Interference and Noise Ratio).

Some of the embodiments described in this disclosure assume that reference signals transmitted by different base stations are synchronized in the time and frequency domains. This is achievable in tightly synchronized network deployments. In practice, this implies that a UE that is monitoring reference signals transmitted by serving or neighbor base stations can assume that all reference signals are using the same timing reference as the serving base station. In the context of this disclosure, the timing reference corresponds to the knowledge of time-unit boundaries, based on a granularity such as orthogonal frequency division multiplexed (OFDM) symbols or OFDM symbol groups or mini-slots or slots or group of slots, and the knowledge of a system frame number, based on the definition of so-called radio frames where a radio frame contains a given number of time-units. The time-unit boundary is determined using synchronization signals while the system frame number is broadcasted by cells as part of a broadcast channel, which is acquired typically as part of the initial access procedure.

Some of the embodiments described in this disclosure may assume that reference signals transmitted by different base stations are not synchronized in the time and frequency domains. This is the case in network deployments that are not tightly synchronized, the UE can no longer assume that the timing reference of a reference signal transmitted by a neighbor base station is the same as the timing reference of a reference signal transmitted by a serving base station. The configuration of a reference signal transmitted by the neighbor base station may then include further information to assist the UE by providing a suitable timing reference while it is monitoring that reference signal. As a first example, that information may be a linkage or an association with a synchronization signal transmitted by the neighbor base station. As a second example, that information may be a system frame number offset used by the neighbor base station, relative to the system frame number used by the serving base station. As a third example, that information may be a system frame number used by the neighbor base station. As a fourth example, that information may be a time-unit offset used by the neighbor base station, relative to the slot boundary of a given time-unit used by the serving base station, where the given time-unit may yet be a reference time-unit such as the first time-unit in the radio frame. As a fifth example, that information may be a time-unit used by the neighbor base station where the reference signal is located. Other combinations and permutations of the above examples can also be envisioned.

Embodiments described in this disclosure aid in efficient inter-cell mobility management, in that the network can inform the UE about the specific MBM events that the network is expecting to be reported from the UE. The network also provides UL configuration information for the UE to use if a mobility beam-based event gets triggered. Using resources configured by the UL configuration information reduces delay because the UE doesn't have to send mobility measurements over a physical uplink shared channel (PUSCH). In some embodiments, uplink transmission resources indicated for MBM reporting allow the UE to directly transmit mobility measurements based on the MBM-RS.

Embodiments described in this disclosure may aid in reduced complexity UE behavior. The UE only detects and measures the MBM-RS indicated in the mobility beam-based event. No processing power is spent detecting or measuring MBM-RSs not indicated in the media/medium access control-control element (MAC-CE) command. The UL physical uplink control channel (PUCCH) resources indicated for mobility beam management (MBM) reporting allow the UE to directly transmit a mobility measurement in case the MBM event gets triggered.

Aspects of the present disclosure provide a simplified method for MBM-RS resource configuration. As part of inter-cell mobility procedures, MBM reference signals may be configured (or reconfigured if the MBM reference signals had a previous configuration) during handover using radio resource control (RRC) reconfiguration. However, reference signal configurations between different base stations are often not drastically different in their content. This enables using the disclosed methods for reconfiguration. Time and frequency resources used by a MBM reference signal may be provided using pre-defined tabulated values.

The use of a tables with pre-defined values for time and/or frequency configurations for the MBM reference signals, allowing the UE to quickly update its internal MBM reference signal configuration.

Reduced flexibility resulting from providing frequency and/or time domain configuration information associated with predefined reconfiguration indices may lead to low overhead mobility commands. Lower overhead requirements allow the network to initiate such commands directly at physical/media access control (PHY/MAC) layers, which should reduce latency.

Aspects of the present disclosure provide aperiodic/semi-persistent reporting based on radio resource management reference signals (RRM-RS), which may enable efficient mobility management, because the network informs the UE about the specific RRM-RS that the network wants the UE to measure and report on.

Aperiodic/semi-persistent reporting based on RRM-RS may result in low complexity UE behaviour. For example, the UE may only detect and measure the RRM-RS indicated in the aperiodic/semi-persistent report request with no processing power spent detecting or measuring RRM-RSs not indicated in the aperiodic/semi-persistent report request.

According to an aspect of the disclosure, there is provided a method for performing—cell-inter mobility management that includes receiving, by a UE from a network, higher-layer signaling comprising configuration information for a plurality of mobility beam management reference signals (MBM-RSs) enabling the UE to measure MBM-RSs transmitted by at least one base station in the network. The method also includes receiving, by the UE from the network, lower-layer signaling comprising additional information relating to monitoring for a mobility beam management (MBM) event. In some embodiments, the lower-layer signaling may be at least one of a Layer 1 (L1) and a Layer 2 (L2) signaling.

According to an aspect of the disclosure, there is provided a method for performing inter-cell mobility management that involves receiving, by a UE from a network, higher-layer signaling comprising configuration information for a plurality of MBM-RSs enabling the UE to measure MBM-RSs transmitted by at least one base station in the network. The method also includes receiving, by the UE from the network, a physical downlink control channel (PDCCH) carrying a downlink control information (DCI) message comprising an identification of at least one MBM-RS to be measured. The method also includes sending to the network a measurement report related to the MBM-RS identified in the DCI message. In some embodiments, the method includes measuring the at least one MBM-RS and generating the measurement report.

According to an aspect of the disclosure, there is provided a device that includes a processor and one or more computer-readable media, having stored thereon processor-readable instructions, that when executed by the processor, perform a method as described above or detailed below.

According to an aspect of the disclosure, there is provided a method for performing inter-cell mobility management that includes transmitting, by a network to a UE, higher-layer signaling comprising configuration information for a plurality of MBM-RSs enabling the UE to measure one or more MBM-RSs transmitted by at least one base station in the network. The method also includes transmitting, by the network to the UE, lower-layer signaling comprising additional information relating to monitoring for a mobility beam management (MBM) event, According to an aspect of the disclosure, there is provided a method for performing inter-cell mobility management that includes transmitting, by a network to a UE, higher-layer signaling comprising configuration information for a plurality of MBM-RSs enabling the UE to measure MBM-RSs transmitted by at least one base station in the network. The method also includes transmitting, by a network to the UE, a PDCCH carrying a downlink control information (DCI) message comprising an identification of at least one MBM-RS to be measured.

According to an aspect of the disclosure, there is provided a device including a processor and one or more computer-readable media, having stored thereon processor-readable instructions, that when executed by the processor, perform a method as described and detailed below.

According to some aspects of the disclosure there is a device including modules or functional units to perform a method as described above and detailed below.

BRIEF DESCRIPTION OF THE DRAWINGS

For a more complete understanding of the present embodiments, and the advantages thereof, reference is now made, by way of example, to the following descriptions taken in conjunction with the accompanying drawings, in which:

FIGS. 1A, 1B and 1C are schematic drawings of multiple frequency layers in the frequency domain and in a serving cell and neighboring cells that may be used in telecommunication cells.

FIG. 4B is a representation of configuration information for use in defining beam resource reference signals for a first cell used in inter-cell mobility according to an aspect of the present disclosure.

FIG. 4C is a list, in tabular form, of frequency resource reconfiguration information according to an aspect of the present disclosure.

FIG. 4D is a list, in tabular form, of time resource reconfiguration information according to an aspect of the present disclosure.

FIG. 4G is a representation of configuration information for use in defining beam resource reference signals for the second cell shown in FIG. 4F used in inter-cell mobility according to an aspect of the present disclosure.

FIG. 5A is a representation of configuration information for use in defining beam resource reference signals for a first cell and a second cell used in inter-cell mobility according to an aspect of the present disclosure.

FIG. 5B is a representation of configuration information for use in defining a beam reference signal event according to an aspect of the present disclosure.

FIG. 5D is a representation of configuration information for use in defining a different beam reference signal event than shown in FIG. 5B according to an aspect of the present disclosure.

FIG. 6A is another example of a MAC-CE command for use in defining beam reference signals according to an aspect of the present disclosure.

FIG. 6B is yet another example of a MAC-CE command for use in beam reference signals according to an aspect of the present disclosure.

FIGS. 7A and 7B are examples of configuration information for an uplink channel to be used by a UE for transmitting beam reporting information for two different cells that are used for inter-cell mobility according to an aspect of the present disclosure.

FIG. 7E is a list, in tabular form, of uplink resource reconfiguration information according to an aspect of the present disclosure.

FIG. 10A is a flow diagram illustrating an example process of using L1/L2 signaling for enabling inter-cell mobility according to an aspect of the present disclosure.

FIG. 10B is another example of a MAC-CE command for use in inter-cell mobility according to an aspect of the present disclosure.

DETAILED DESCRIPTION OF ILLUSTRATIVE EMBODIMENTS

Figure 1D:
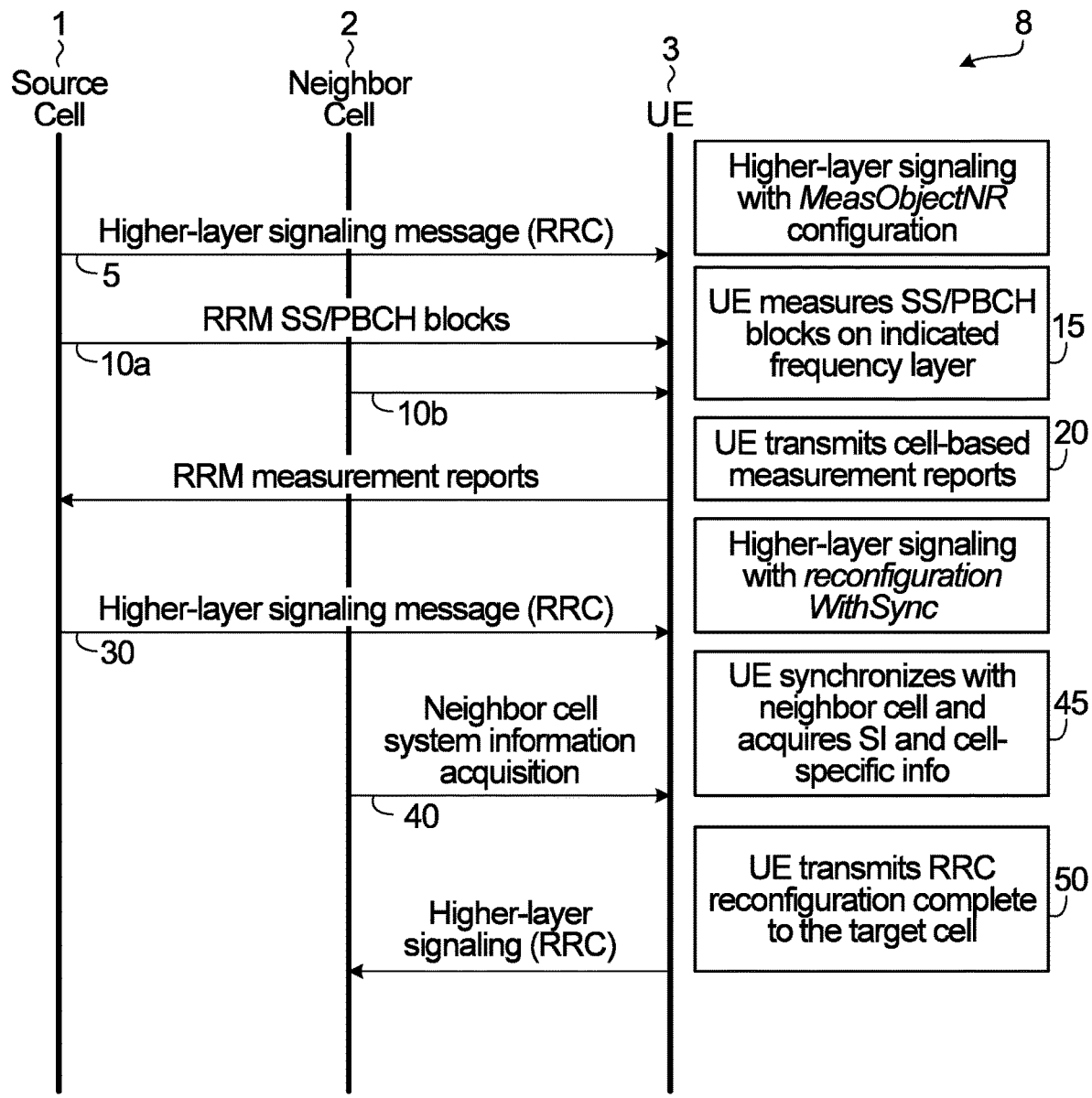
FIG. 1D is a flow diagram illustrating an example of L3 based methods for inter-cell mobility management currently supported by New Radio (NR).

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

The following portion of the disclosure describes an example of a L3-based method for inter-cell mobility management that may be used in the New Radio (NR) standard to provide a comparison to the L1/L2-based methods for inter-cell mobility management (hereinafter referred to as L1/L2-based inter-cell mobility management methods) provided by the present disclosure.

UEs are configured to perform radio resource management (RRM) measurements on reference signals and report results of those RRM measurements to a wireless network of a wireless communication system. Such functionality is supported using higher-layer signaling (i.e. high-layer messages), which may include one or more information elements (IE) that provide the UE with configuration information regarding a particular reference signal (RS) that the UE should measure. An example of such an IE is a measurement configuration NR (MeasConfigNR) object. Each MeasConfigNR object includes resource configuration (e.g. Synchronization Signal/Physical Broadcast Channel (SS/PBCH) blocks and channel state information reference signal (CSI-RS)) for the UE to perform RRM measurements on reference signals.

The UE can be configured to connect to the network based on identification of a frequency layer and a cell identifier, such as a physical cell identifier (PCI). A frequency layer is defined as a combination of a center frequency and a subcarrier spacing. A particular example will now be described in which the UE is configured to perform RRM measurements on two frequency layers, where the first frequency layer is referred to in the example as "ssbFrequency1" and the second frequency layer is referred to as "ssbFrequency2". FIG. 1A illustrates an example of two bandwidths in the frequency domain, each bandwidth corresponding to a frequency layer having a respective center frequency and having a subcarrier spacing, where subcarrier spacing denotes the distance in frequency between two subcarriers. The two bandwidths in FIG. 1A are labelled with their corresponding frequency layer "ssbFrequency1" and "ssbFrequency2", respectively.

In the present disclosure, in a wireless communication system using, for example, NR (New Radio) radio access technology, there are entities called "synchronization rasters", which are tables of frequencies where a UE can look for synchronization signals (i.e. SS/PBCH blocks). As part of performing a cell search process, the UE scans different frequencies for synchronization signals (i.e. SS/PBCH blocks), attempts to detect synchronization signals (i.e. SS/PBCH blocks), and detects the PCI of a cell of a coverage area of a network that the UE is in. Depending on a deployment of base stations in a network ("network deployment") and on assumptions that are made as part of the deployment, different SS/PBCH blocks may be transmitted using different subcarrier spacings. Acquiring time and frequency synchronization is a process that the UE may go through as part of initial access process performed by the UE as part of RRM measurement for inter-cell mobility management measurements. When a UE performs measurements on SS/PBCH blocks from neighbor cells, the UE may have to go through the synchronization process again. A purpose of synchronization signals is for the UE to acquire the symbol timing and subcarrier frequency of downlink signals so that the UE knows about the time-frequency resource grid being used by downlink signals.

In the embodiments of the methods and devices of the present disclosure, a "cell" is a geographic region or area where a UE is able to receive reference signals (such as synchronization signals) that are identified using one value of a physical cell identifier. A "base station" is a hardware equipment used for wireless networks that transmits and receives wireless signals. Cellular networks, such as radio access networks, are one variant of wireless networks. A cellular network (e.g. a radio access network) provides a coverage area that is divided up into "cells". In some situations, a cell may be served by multiple beams. To achieve 360° of coverage in a cell, there may be 3 beams each covering 120°, six beams each covering 60°, or various other alternative arrangements of numbers of beams covering particular portions of the cell. The size of the beams does not need to be equivalent. For example, if one portion includes a high usage density portion of the cell, there may be several narrower beams covering that area to provide a higher bandwidth capacity of the portion and fewer, wider beams in the remainder of the cell. When a UE travels it may move from one cell to another cell which results in a base station currently serving the UE in the cell the UE is leaving having to handover to a new base station in a cell that the UE is entering. Furthermore, within one cell, a UE may receive different beams as it moves within the cell. When on a boundary region between cells, a UE may be handed back and forth between neighbor cells as various beams of the neighbor cells are found to have better service than others. The functionality of a cellular network providing continuous coverage during the movement of UEs is often referred to as inter-cell mobility management.

In the case of NR, the coverage area of a cellular network (e.g. a radio access network) is where the UE is able to detect a SS/PBCH block for a given value of PCI corresponds to a "cell". In typical deployments of cellular networks (e.g. radio access networks), a base station may transmit physical layer signals that correspond to one or more cells, while physical layer signals corresponding to one cell may only be transmitted by one base station. As part of the embodiments for enhanced inter-cell mobility management methods described herein, the terms "source cell" and "serving cell" may be used inter-changeably.

In this example, the UE is configured by the cellular network (e.g. radio access network) to perform measurements on reference signals in the form of SS/PBCH blocks, also known as synchronization signal blocks (SSB). A cell that the UE is currently in and the UE is being served by that cell will be referred to as the serving cell and other adjacent cells will be referred to as neighbor cells. The serving cell and the neighbor cells each have an associated SSB index for identifying a reference signal from a group of reference signals having associated indices, and a PCI. The UE performs RRM measurements on both of the frequency layers and transmits measurement reports for SSBs the UE is able to detect. These measurement reports carry cell-based quality reports.

FIG. 1B illustrates an example of a serving cell and six neighboring cells using the first frequency layer (ssbFrequency1) and FIG. 1C illustrates seven neighboring cells using the second frequency layer (ssbFrequency2). The cells in FIG. 1B and FIG. 1C are representative of the same physical cells using different frequency layers for communication. The two figures (e.g. FIG. 1B and FIG. 1C) are shown separately simply for the sake of explanation and to more clearly describe the labelling of SSB index and PCI value for each respective cell.

The serving cell in FIG. 1B has an SSB Index=0 and PCI=1. Neighbor cell #1 has an SSB Index=2 and PCI=2. Neighbor cell #2 has an SSB Index=3 and PCI=3. Neighbor cell #3 has an SSB Index=5 and PCI=4. Neighbor cell #4 has an SSB Index=7 and PCI=5. Neighbor cell #5 has an SSB Index=8 and PCI=6. Neighbor cell #6 has an SSB Index=9 and PCI=7.

In FIG. 1C, Neighbor cell #0 has an SSB Index=0 and PCI=11. Neighbor cell #1 has an SSB Index=1 and PCI=12. Neighbor cell #2 has an SSB Index=2 and PCI=13. Neighbor cell #3 has an SSB Index=4 and PCI=14. Neighbor cell #4 has an SSB Index=5 and PCI=15. Neighbor cell #5 has an SSB Index=6 and PCI=16. Neighbor cell #6 has an SSB Index=9 and PCI=17. The UE is configured to measure SSB indexes {0, 2, 3, 5, 7, 8, 9} on ssbFrequency1 and SSB indexes {0, 1, 2, 4, 5, 6, 9} on ssbFrequency2.

In both FIGS. 1B and 1C, a UE is shown to be near the edge of the serving cell in close proximity to neighbor cell #1 and neighbor cell #2. After the UE performs an inter-cell mobility management method (i.e. an inter-cell mobility management process and reports measurement information to the cellular network (hereinafter referred to as network), the network may send a handover command to the UE, instructing the UE that a neighbor cell is to be the new serving cell.

FIG. 1D is a signaling diagram 8 illustrating the signaling between the network (including a source cell 1 that is serving a UE 3 and a neighbor cell 2 of the source cell) and the UE 3 being served. While only a single neighbor cell is shown in the signaling diagram 8, it is understood there similar signaling may occur between the UE 3 and multiple neighbor cells. Furthermore, the same process (i.e. the process of the UE 3 measuring SS/PBCH blocks sent by the network via neighbor cells) may be occurring for multiple UEs in the network. The network (not shown), via the source cell 1, sends 5 to the UE 3 higher-layer signaling (i.e. a higher-layer message), such as radio resource control (RRC) signaling (i.e. a RRC message) with configuration information for the UE 3. A particular example of such an RRC signaling (i.e. a RRC message) may include a measurement object information element (IE) as part of the configuration message, such as "MeasObjectNR" IE. The "MeasObjectNR" IE is a higher-layer parameter which the network uses to provide configuration to the UE 3 about radio resource management reference signals upon which to perform mobility measurements. The network, via the source cell 1, transmits 10a radio resource management (RRM) reference signals (for example SS/PBCHs) and transmits 10b, via the neighbor cell 2, RRM reference signals (for example SS/PBCHs). The UE 3 measures 15 signal strength, for example in the form of (e.g. received signal response power (RSRP), signal-to-noise ratio (SNR), received signal strength indicators (RSSI)) the reference signals sent by the network via the source cell 1 and the neighbor cell 2. The UE 3 sends 20 cell based measurement reports to the source cell 1. The network via the source cell 1 sends (i.e. transmits) 30 a handover (HO) command in a higher-layer signaling (i.e., a higher-layer message) to the UE 3, such as RRC signaling (i.e. an RRC message). An example of such RRC signaling (i.e. an RRC message) may include a "reconfigurationWithSync" configuration message. The network, via the neighbor cell 2, transmits 40 neighbor cell system information to the UE 3. The UE 3 synchronizes 45 with the neighbor cell 2 and acquires the system information (SI) and cell-specific information transmitted by the network to the neighbor cell 2. The UE 3 sends 50 to the neighbor cell 2 higher-layer signaling (i.e. a higher-layer message), such as RRC signaling (i.e. an RRC message), that indicates the reconfiguration is complete.

After receiving the handover command carrying configuration information for the UE 3 (an example of which is the "reconfigurationWithSync" message), the UE 3 acquires physical layer synchronization with the neighbor cell 2 and acquires system information from the network via neighbor cell 2 (i.e. master information block (MIB)) and cell-specific information (e.g. system information block (SIB1)). Upon completing a Random Access (RA) procedure (i.e. a RA process), the UE 3 sends (i.e. transmits) a RRC reconfiguration complete message to confirm that the HO procedure is complete.

Figure 1E:
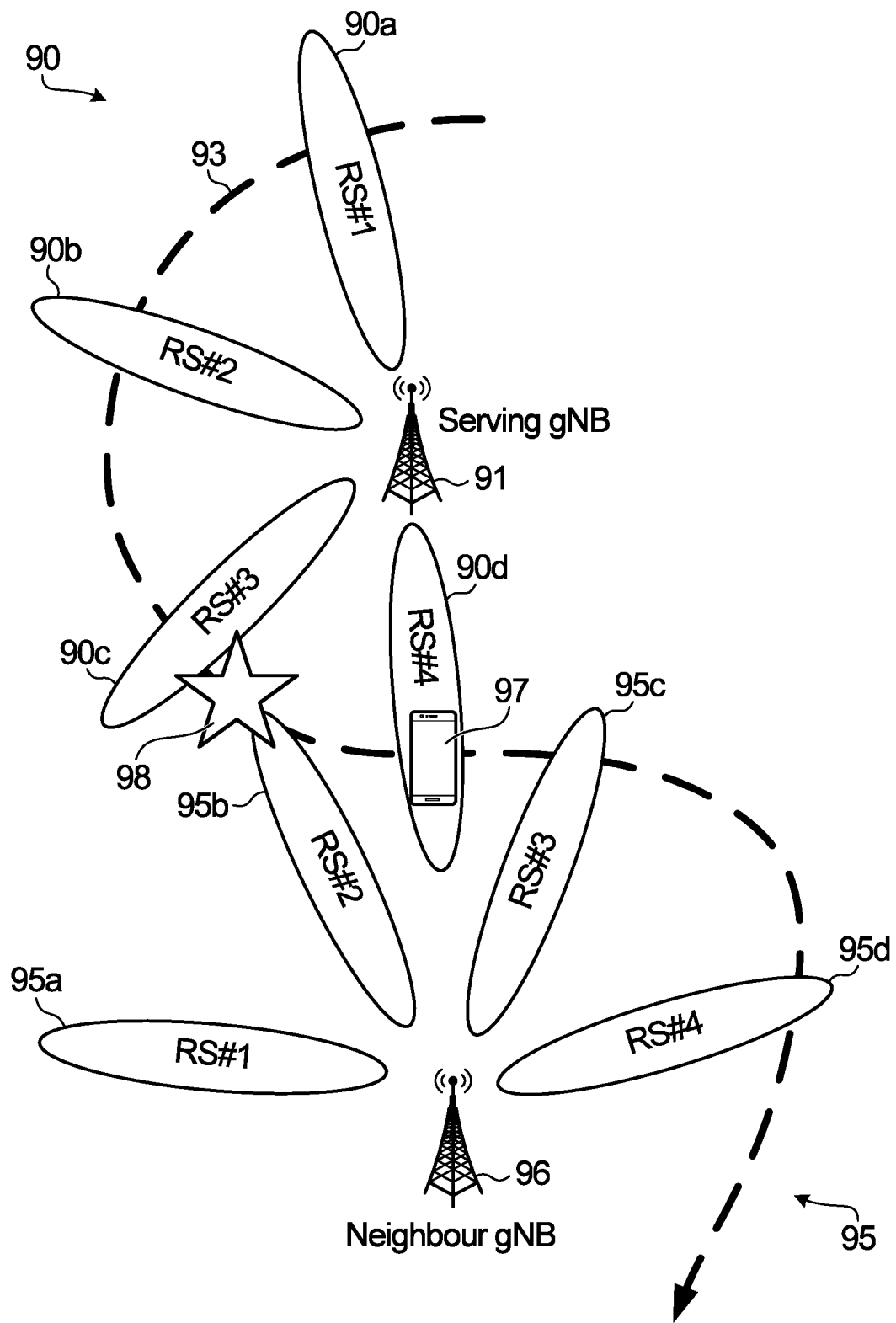
FIG. 1E is a schematic diagram of two neighboring cells, that each include multiple beams, and a user equipment (UE) that is travelling along a path and interacting with the neighboring cells.

FIG. 1E is an example of two adjacent cells, each having multiple beams. A path 93 of a UE 97 is also shown moving through the area served by the two cells. A first cell 90, including a serving base station (gNB) 91, is shown to have four beams 90a, 90b, 90c and 90d. A first reference signal RS #1 is transmitted on beam 90a. A second reference signal RS #2 is transmitted on beam 90b. A third reference signal RS #3 is transmitted on beam 90c. A fourth reference signal RS #4 is transmitted on beam 90d. A second cell 95, including a neighbor base station (gNB) 96, is shown to have four beams 95a, 95b, 95c and 95d. A first reference signal RS #1 is transmitted on beam 95a. A second reference signal RS #2 is transmitted on beam 95b. A third reference signal RS #3 is transmitted on beam 95c. A fourth reference signal RS #4 is transmitted on beam 95d. The reference signals for each of the first cell 90 and second cell 95 are defined by a respective scrambling identifier which would be different for the different cells. For example, RS #1 of the first cell 90 and RS #1 of the second cell 95 have different scrambling identifiers even though they are considered RS #1 for their respective cell.

The UE 97 is shown on the path 93 located in closest proximity to beam 90d of the first cell 90. However, it can be seen that the path 93 takes the UE 97 in close proximity to beam 95b of the second cell 95 and will take the UE 97 in close proximity to beam 95c of the second cell 95. Aspects of the present disclosure will describe how the UE may make measurements of the reference signals on beams the UE 97 is travelling in close proximity to in order to determine which beam the UE 97 should use for best signal reception. This may result in the UE 97 being handed over form the first cell 90 to the second cell 95, or vice versa.

Aspects of the present disclosure pertain to methods of tracking inter-cell mobility events based on transmission beams. Typical inter-cell mobility management methods require the UE to track inter-cell mobility events based on cells, which is inefficient in beam-based deployments. An example of a beam-based deployment is a frequency range 2 (FR2) implementation. Furthermore, the mobility management methods are higher layer signaling based, such as L3 signaling-based, which typically uses radio resource control (RRC) signaling. L3-based signaling inherently induces latency as messages have to travel across several layers.

Mobility management methods typically involve the UE explicitly synchronizing at the physical layer with a neighbor cell, also referred to as a target cell (the cell being handed over to) and acquiring system information and cell information before the target cell can start sending physical downlink control channel (PDCCH) transmissions that schedule physical downlink shared channel (PDSCH) transmissions carrying UE-specific data.

Aspects of the present disclosure are directed to methods of reporting inter-cell mobility events based on transmission beams. As indicated above, conventional inter-cell mobility methods rely on cell-based events that are L3-based. Anytime an inter-cell mobility event is triggered, an inter-cell measurement report is generated and sent to lower layers. The inter-cell measurement report is transmitted to the network using an uplink (UL) PUSCH transmission, where the measurement report eventually reaches the RRC layer of the serving base station.

Aspects of the present disclosure introduce lower layer signaling, for example L1 signaling and/or L2 signaling, based mobility beam management methods. One or more particular aspects disclosed herein may enable methods for mobility beam management, which include functionalities such as, but not limited to:

mobility beam-based event tracking that include functionality to indicate mobility beam events for the UE to track;

default UL resource configuration for mobility beam reporting that includes functionality to indicate default bandwidth part (BWP) and PUCCH configuration for MBM reporting; and compressed downlink resource configuration for mobility beam measurement that enable a UE to update the UE's internal configuration using compressed resource configuration.

In some beam-based network deployments, the UE may be in cells of different beam sets at different times. In some embodiments, by allowing the network to configure the UE with mobility beam based event information, the UE can track specific mobility events based on beams and report measurements back to the network based on those events.

Throughout the embodiments described in this disclosure, unless other indicated, a MBM reference signal can be either a beam management (BM) reference signal or a mobility/RRM reference signal. Also, throughout the embodiments described in this disclosure, unless other indicated, reference to mobility beams and MBM reference signals are used inter-changeably.

Embodiments described herein are applicable to wireless networks such as wireless cellular networks. The types of network nodes that can be used in such wireless cellular networks can be regular base stations (e.g. towers with sectors), flying base stations (e.g. drones), and aerial vehicles (e.g. balloons, planes).

Figure 2:
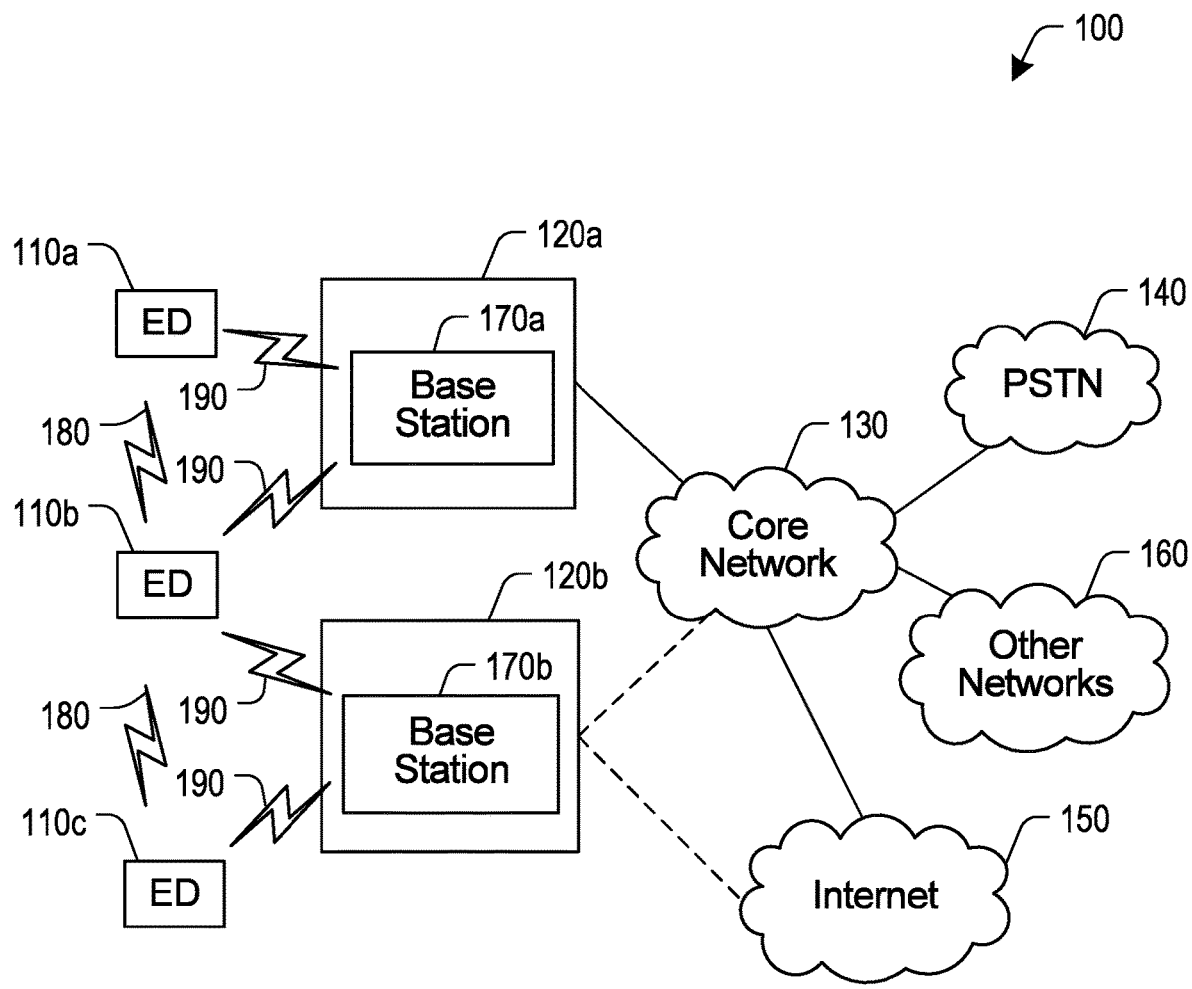
FIG. 2 is a schematic diagram of a communication system in which embodiments of the disclosure may occur.
Figure 3A:
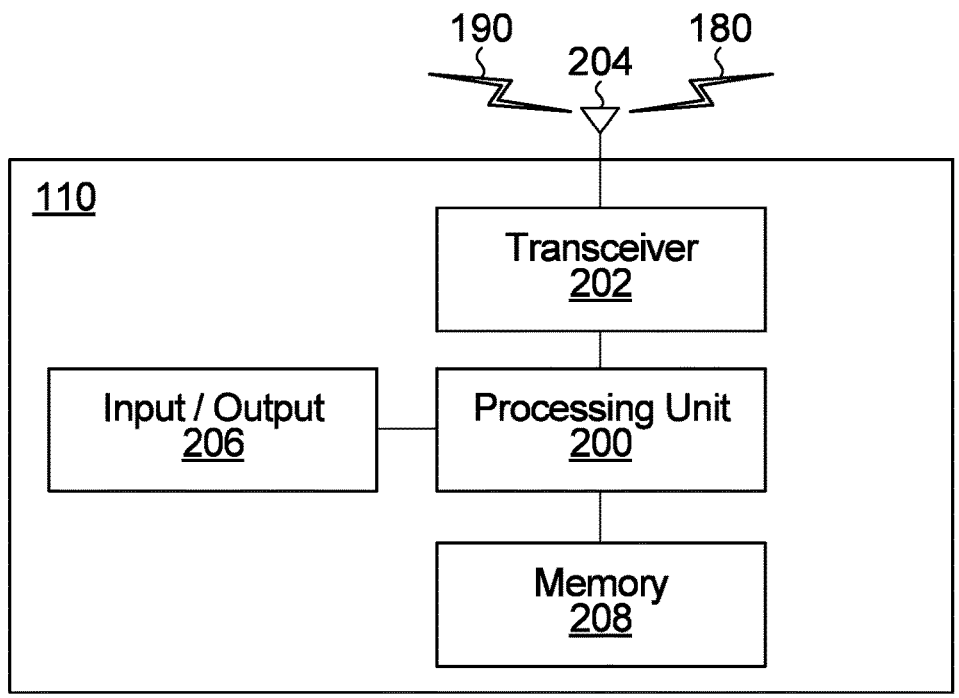
FIGS. 3A and 3B are block diagrams of an example user equipment and base station, respectively, in which embodiments of the disclosure may occur.
Figure 3B:
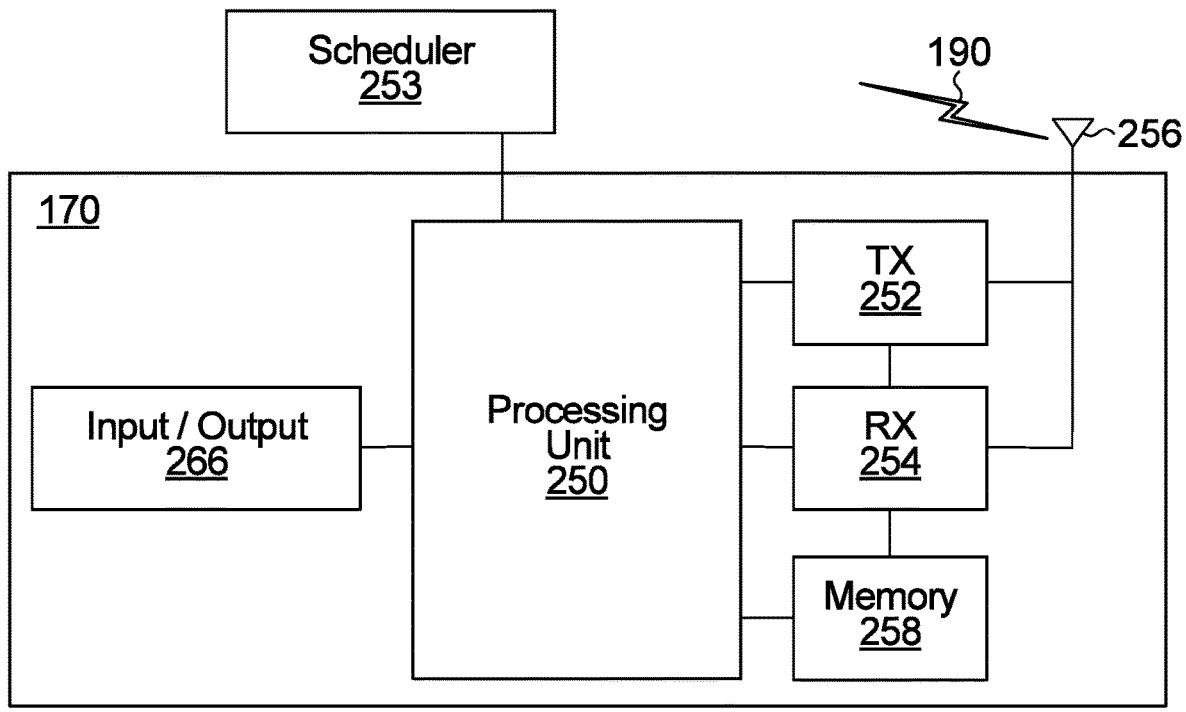

FIGS. 2, 3A, and 3B following provide context for the network and devices of a wireless communication system that may implement aspects of the inter-cell mobility management methods of the present disclosure.

FIG. 2 illustrates an example wireless communication system 100 (hereinafter referred to as system 100) which includes a network in which embodiments of the inter-cell mobility management methods of present disclosure could be implemented. In general, the system 100 enables multiple wireless or wired elements to communicate data and other content. The purpose of the system 100 may be to provide content (voice, data, video, text) via broadcast, narrowcast, user device to user device, etc. The system 100 may operate efficiently by sharing resources such as bandwidth.

In the example shown in FIG. 2, the system 100 includes electronic devices (ED) 110a-110c (generally referred to as ED 110), radio access networks (RANs) 120a-120b (generally referred to as RAN 120), a core network 130, a public switched telephone network (PSTN) 140, the Internet 150, and other networks 160. While certain numbers of these components or elements are shown in FIG. 2, any reasonable number of these components or elements may be included in the system 100.

The EDs 110a-110c are configured to operate, communicate, or both, in the system 100. For example, the EDs 110a-110c are configured to transmit, receive, or both wireless signals via wireless communication channels. Each ED 110a-110c represents any suitable end user device for wireless operation and may include such devices (or may be referred to) as a user equipment/device (UE), wireless transmit/receive unit (WTRU), mobile station, mobile subscriber unit, cellular telephone, station (STA), machine type communication device (MTC), personal digital assistant (PDA), smartphone, laptop, computer, touchpad, wireless sensor, or consumer electronics device. The EDs 110a-110c are examples of UEs in FIGS. 1B, 1C, and 1D above, as well as UEs 453, 583, 683, 753, 803, 953, 1053 in FIGS. 4H, 5E, 6C, 7F, 8, 9B, and 10D described below.

In FIG. 2, the RANs 120a-120b include base stations 170a-170b, respectively. Each base station 170a-170b (generally referred to as base station 170) is configured to wirelessly interface, access or communicate with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB, a transmission and receive point (TRP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding. The base stations of the RANs 120, such as base station 170a of the RAN 120a and the base station 170b of the RAN 120b can access the core network 130 via the internet 150, as shown.

The EDs 110a-110c and base stations 170a-170b are examples of communication equipment, devices, or apparatuses that can be configured to implement some or all of the functionality and/or embodiments of the inter-cell mobility management methods described herein. In the embodiment shown in FIG. 2, the base station 170a forms part of the RAN 120a (i.e. is included in the RAN 120a), and the RAN 120a may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part (i.e. is included in) of the RAN 120b, and the RAN 120b may include other base stations, elements, and/or devices. Each base station 170a-170b transmits and/or receives wireless signals within a particular geographic region or area, sometimes referred to as a "cell". A cell may be further divided into sectors, and a base station 170a-170b may, for example, employ multiple transceivers to provide service to multiple sectors. Base stations such as stations 170a-170b are examples of communication equipment, devices, or apparatuses that are used to provide the source cell and neighbor cells in FIGS. 1B, 1C and 1D, as well as figures below. In some embodiments, pico or femto cells may be established by the base stations 170 of a RAN where the radio access technology supports such use-cases based on heterogeneous network deployments. In some embodiments, multiple transceivers could be used for each cell, for example using multiple-input multiple-output (MIMO) technology. The number of RANs shown in FIG. 2 is exemplary only. Any number of RANs may be included in the system 100 by a network service provider.

The base stations 170a-170b wirelessly interface, access, or communicate with one or more of the EDs 110a-110c over one or more air interfaces 190 using wireless communication links e.g. radio frequency (RF), microwave, infrared (IR), etc. The air interfaces 190 may utilize any suitable radio access technology. For example, the system 100 may implement one or more orthogonal or non-orthogonal channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as High Speed Packet Access (HSPA), Evolved HPSA (HSPA+) optionally including High Speed Downlink Packet Access (HSDPA), High Speed Uplink Packet Access (HSUPA) or both. Alternatively, a base station 170a-170b may establish an air interface 190 with Evolved UTMS Terrestrial Radio Access (E-UTRA) using LTE, LTE-A, and/or LTE-B. It is contemplated that the system 100 may use multiple channel access functionality, including such methods as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE, and GERAN. Of course, other multiple access methods and wireless protocols may be utilized.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160).

The EDs 110a-110c may also wirelessly interface, access or communicate with one another over one or more SL air interfaces 180 using wireless communication links e.g. radio frequency (RF), microwave, infrared (IR), etc.

In addition, some or all of the EDs 110a-110c may include functionality for communicating with different wireless networks over different wireless links using different wireless technologies and/or protocols. Instead of wireless communication (or in addition thereto), the EDs 110a-110c may communicate via wired communication channels to a network service provider (not shown) or switch (not shown), and to the internet 150. PSTN 140 may include circuit switched telephone networks for providing plain old telephone service (POTS). Internet 150 may include a network of computers and subnets (intranets) or both, and incorporate protocols, such as internet protocol (IP), transmission control protocol (TCP) and user datagram protocol (UDP). EDs 110a-110c may be multimode devices capable of operation according to multiple radio access technologies and incorporate multiple transceivers necessary to support multiple radio access technologies.

FIGS. 3A and 3B illustrate example devices that may implement the inter-cell mobility management methods and teachings according to this disclosure. In particular, FIG. 3A illustrates an example ED 110, and FIG. 3B illustrates an example base station 170. These components could be used in the system 100 or in any other suitable system.

As shown in FIG. 3A, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the communication system 100. The processing unit 200 may also be configured to implement some or all of the functionality and/or embodiments of the inter-cell mobility management methods described in more detail herein. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna 204 or Network Interface Controller (NIC) (not shown). The transceiver 202 is also configured to demodulate data or other content received by the at least one antenna 204. Each transceiver 202 includes any suitable structure for generating signals for wireless transmission by the antenna 204 or wired transmission by the NIC (not shown) and/or processing signals received wirelessly by the antenna 204 or received by wire by the NIC (not shown). Each antenna 204 includes any suitable structure for transmitting and/or receiving wireless signals and/or each NIC (not shown) includes any suitable structure for transmitting and/or receiving wired signals. One or multiple transceivers 202 could be used (i.e. included) in the ED 110. One or multiple antennas 204 could be used (i.e. included) in the ED 110. Although shown as a single functional unit, a transceiver 202 could also be implemented using at least one transmitter and at least one separate receiver.

The ED 110 further includes one or more input/output devices 206 or other interfaces (such as a wired interface to the internet 150). The input/output devices 206 may enable a user to interact with the ED 110. Each input/output device 206 includes any suitable structure for providing information to or receiving information from a user. Examples of input/output devices 206 include a speaker, microphone, keypad, keyboard, display, or touch screen, and the suitable structure may be a communications interface, such as a peripheral bus. The other interfaces of the ED 110 may enable the ED 110 to interact, access, or communicate with other devices via the Internet 150, such as other EDs 110, servers, a cloud computing platform, and the like.

In addition, the ED 110 includes at least one memory 208. The memory 208 stores instructions and data used, generated, or collected by the ED 110. For example, the memory 208 could store software instructions that implement some or all of the functionality and/or embodiments of the inter-cell mobility management methods described above and that are executable by the processing unit(s) 200. Each memory 208 includes any suitable volatile storage and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 3B, the base station 170 includes at least one processing unit 250, at least one transmitter 252, at least one receiver 254, one or more antennas 256, at least one memory 258, and one or more input/output devices 266 or other interfaces (not shown). A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless transmission to one or more EDs 110, or wired transmission to other base stations 170, the core network 130, or the Internet 150. Each receiver 254 includes any suitable structure for processing signals received wirelessly from one or more EDs or received via wire from other base stations 170, the core network 130, or the Internet 150. Although shown as separate components, at least one transmitter 252 and at least one receiver 254 could be combined into a single component, generally known as a transceiver. Each antenna 256 includes any suitable structure for wireless transmitting signals received from the transmitter 252 and/or receiving wireless signals from EDs 110. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores software instructions and data used, generated, or collected by the base station 170. For example, the memory 258 could store software instructions or modules that implement some or all of the functionality and/or embodiments of the inter-cell mobility management methods described above and that are executable by the processing unit(s) 250.

Each input/output device 266 enables a user to interact with a base station 170. Each input/output device 266 includes any suitable structure for providing information to or receiving/providing information from a user, such as a peripheral bus. The other interfaces of the base station 170 may enable the base station 170 to interact, access, or communicate with other devices via the Internet 150, such as other EDs 110, servers, a cloud computing platform, and the like Additional details regarding the UEs 110 and the base stations 170 are known to those of skill in the art. As such, these details are omitted here for clarity.

The physical arrangement of first cell 90 and second cell 95 shown in FIG. 1E will now also be used in describing various embodiments of the present disclosure.

The following embodiment refers to L1/L2 signaling-based DL resource reconfiguration for mobility beam management and gives a detailed example of resource reconfiguration for a UE. In the context of this disclosure, it is assumed that information relating to a mobility beam management reference signal (MBM-RS), using a particular index to identify the beam that is transmitted by a first base station, is updated to correspond to a MBM-RS (using the same index as previously used) that is being transmitted by a second base station. For example, if an index used for first beam information is Index #1 for the first base station, then the beam information for the second base station is also associated with Index #1. However, the principle of updating information relating to an MBM-RS can be applied regardless of the index of the MBM-RS.

Referring back to FIG. 1E, the UE 97 is moving along the path 93 depicted by a dashed black line. The UE 97 in the position shown in FIG. 1E is connected to a serving gNB 91, receiving signaling via beam 90d.

It is assumed that after completing an initial access process performed by the UE 97, the network sends an initial RRC configuration message to the UE 97, containing configuration information for MBM-RSs associated with the beams of the serving gNB 91. The UE 97 receives the configuration information and configures itself for defining four MBM-RSs on respective beams used by base station 91, denoted as RS #1-4. An illustration of the time/frequency configuration of the MBM-RSs, as well as an extract of the corresponding RRC configuration information for RS #1-4 is shown in FIGS. 4A and 4B.

Figure 4A:
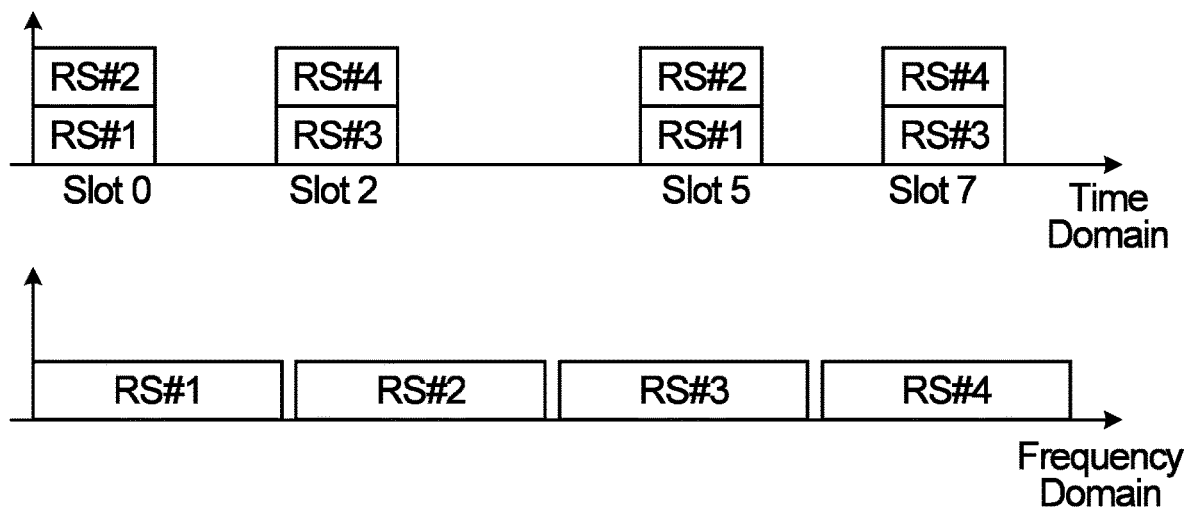
FIG. 4A is an example of a time domain representation of reference signals for respective beams of a first cell and a frequency domain representation of the same reference signals that could be configured to be monitored by a UE according to an aspect of the present disclosure.

FIG. 4A shows a time domain representation (the top graphical plot in FIG. 4A having increasing time along the horizontal axis) and a frequency domain representation (the bottom graphical plot in FIG. 4A having various frequency bands along the horizontal axis) of the reference signals, (i.e. the MBM-RSs). In the time domain representation, reference signals RS #1 and RS #2 are shown occupying Slot 0 and reference signals RS #3 and RS #4 are shown occupying Slot 2. The reference signals are repeated in the same manner in Slots 5 and 7. In the frequency domain representation, reference signals RS #1, RS #2, RS #3 and RS #4 are shown occupying four adjacent bandwidth portions.

FIG. 4B is an example of a representation of configuration information used by a UE to enable the UE to configure itself to identify reference signals that could be measured by the UE, for example reference signals that are shown in FIG. 4A or FIG. 1E. The numbering hierarchy of the parameters shown in FIG. 4B and the subsequent figures with the labelling of Levels 1>, 2>, 3>, etc. is to facilitate an understanding of information included in the configuration information and it is to be understood that there may not be explicit level labelling included with this configuration information. For each of four beams, for example the four beams 90a, 90b, 90c and 90d of serving gNB 90 of FIG. 1E, the reference signals corresponding to those beams are identified based on parameters such as, but not limited to, a reference signal resource identifier (for example a channel state identifier reference signal (CSI-RS)-ResourceID), a scrambling identifier (for example scramblingID), periodicity and offset information and resource mapping information. The reference signal resource identifier periodicity and offset information and resource mapping information may be considered time-frequency resource information.

In FIG. 4B, Level 1, i.e. "1>", includes a naming convention for the reference signal measurement configuration information (for example CSI-MeasConfig). Level 2, i.e. "2>", includes a naming convention for adding or modifying the reference signals (for example using CSI-RS=ResourceToAddModList). Level 3, i.e. "3>", includes a naming convention for defining resources to be used for reference signals, for example CSI-RS Resources. Levels 4 and 5, i.e. "4>" and "5>", define various parameters for the reference signals. For each reference signal a resource identifier (CSI-RS-ResourceID), scrambling identifier "scramblingId" and resource mapping information that may include defining a frequency band (freqBand) in terms of a starting resource block (RB) (startingRB) and a number of RBs (numberofRBs) that the resource is allotted. The first reference signal has CSI-RS-ResourceID=1 and scramblingID=9. The frequency band mapping information (defining a frequency bandwidth part (BWP), is defined having a startingRB=4 and numberofRBs=48. The second reference signal has CSI-RS-ResourceID=2, a scramblingID=9, and the frequency band mapping information is defined by startingRB=54 and numberofRBs=48. The third reference signal has CSI-RS-ResourceID=3, a scramblingID=9, and the frequency band mapping information is defined by startingRB=104 and numberofRBs=48. The fourth reference signal has CSI-RS-ResourceID=4, a scramblingID=9, and the frequency band mapping information is defined by startingRB=154 and numberofRBs=48.

In order to provide the UE with the configuration information, the network, via a serving gNB, sends (i.e. transmits) a MAC-CE mobility command to the UE, carrying an indication to update its MBM-RS configuration for RS #1-4. The MAC-CE mobility command may be transmitted, for example, on a physical download shared channel (PDSCH). In some embodiments, the UE sends an acknowledgement of the PDSCH carrying the MAC-CE command to the network, via the serving gNB, within a determined time. In some examples, the determined time indicated here may be a processing delay needed by the UE to process a data block in the PDSCH transmission and send the acknowledgement to the MAC layer. This processing delay is known to both the network and the UE and allows the network and the UE to have a mutual understanding about when the MAC-CE command is going to be applied by the UE. As a non-limiting example, in 5G systems based on NR, this processing delay is specifically stated in the 5G specification as being equal to 3 milliseconds (ms). After acknowledging the MAC-CE command, the UE applies the content of the MAC-CE command. For example, the UE updates the MBM-RS configuration information based on the information sent in the MAC-CE command. The UE then performs detection and measurement of the updated MBM-RS for the purpose of mobility beam management.

This embodiment may be applicable to scenarios where the UE is moving between different base stations and needs to be informed about the mobility beams that the UE is supposed to detect, measure and report on from the different base stations. The use of higher layer signaling based, such as L3 signaling-based, reconfiguration is fully flexible, but it is time-consuming in its nature. In contrast, lower layer signaling based, L1/L2 signaling-based, reconfiguration may have less flexibility, but it is faster in implementation. Such reconfiguration by L1/L2 signaling allows the network to select one group of configuration information parameters from among a pre-defined set of such groups of configuration information parameters. In some embodiments, the groups of configuration information parameters are maintained in a tabulated form. Using such a reconfiguration process allows the network to update specific aspects of reference signal configuration relevant for detection and measurement purposes, while limiting a set of usable values to specific values of interest. Examples of frequency resource reconfiguration and time resource reconfiguration tables are illustrated in FIGS. 4C and 4D, respectively.

FIG. 4C illustrates an example of a tabular list of index values (found in the column identified as Freq. Resource Reconfiguration field) that can be used to provide information for various different values for two particular frequency domain related parameters. In the example of FIG. 4C there are 64 different index values, ranging from 0 to 63. These index values may be represented in a binary bit field of 6 bits. The two frequency domain related parameters that are shown to be represented by these 64 different index values are a starting resource block (RB) (Starting RB) value and a reference signal (RS) bandwidth (RS bandwidth) value. An index value of "0" is shown to correspond to a Starting RB of 10 and a RS bandwidth of 24. An index value of "1" is shown to correspond to a Starting RB of 70 and a RS bandwidth of 24. The remaining index values corresponding to other Starting RB values and RS bandwidth values, and at least one index value reserved for some other purpose. Therefore, a pair of values for Starting RB and RS bandwidth can be represented by a single index value.

FIG. 4D illustrates an example of a list of index values (found in the column identified as Time Resource Reconfig. field) that can be used to provide information for various different index values for three particular time domain related parameters. In the example of FIG. 4D there are 64 different index values, ranging from 0 to 63. These index values can be represented in a binary bit field of 6 bits. The three time domain related parameters that are shown to be represented by these 64 different index values are a first OFDM symbol (firstOFDMSymbolinTimeDomain) value, a slot periodicity (slotPeriodicity) value and a slot offset (slotOffset) value. An index value of "0" is shown to correspond to a first OFDM symbol of 0, a slot periodicity of 4 and a slot offset of 0. An index value of "1" is shown to correspond to a first OFDM symbol of 0, a slot periodicity of 4 and a slot offset of 2. The remaining index values corresponding to other first OFDM symbol values, slot periodicity values and slot offset values and at least one index value reserved for some other purpose. Therefore, a set of values for firstOFDMSymbolinTimeDomain, slotPeriodicity value and a slotOffset can be represented by a single index value.

The examples of FIGS. 4C and 4D or not intended to be limited to just the information illustrated. For example, the lists could include a greater amount than 64 values or a lesser amount than 64 values. Furthermore, additional time or frequency domain configuration parameters could be added to provide additional configuration information for a given index value. Also, the values in the tables for these parameters are only examples and it is to be understood that the values could be any values relevant to the particular network. Furthermore, there may be no reserved fields or more than the one reserved field as shown in each of FIGS. 4C and 4D.

Figure 4E:
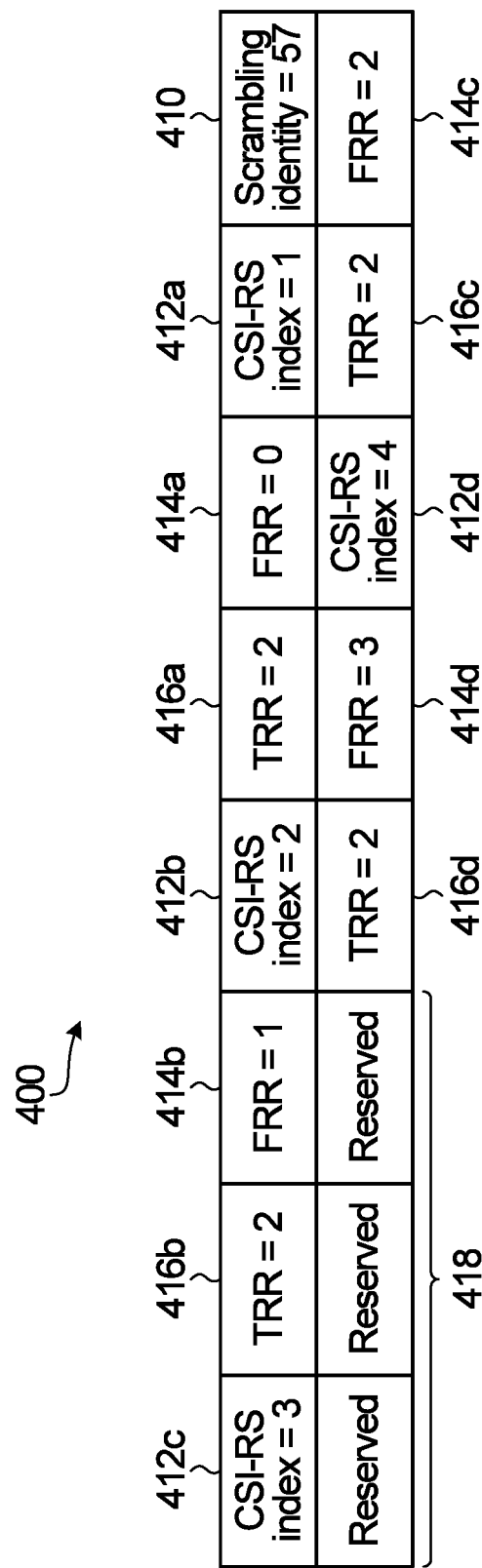
FIG. 4E is an example of a media access control-control element (MAC-CE) command for use in inter-cell mobility according to an aspect of the present disclosure.

FIG. 4E is an example of a MAC-CE 400 command that may be sent by the network to provide the UE with MBM-RS configuration information. The example MAC-CE command 400, and other MAC-CE commands described below in other examples, are schematic diagrams representing various fields, made up of one or more bits, that are included in the MAC-CE commands.

The MAC-CE command 400 contains (i.e. carries) configuration information about a scrambling identity, reference signal indexes and time/frequency resource reconfiguration fields per reference signal. The scrambling identity is identified in the MAC-CE command 400 by a scrambling identity field 410. For a first beam, the reference signal index (i.e. for a CS-RS) is identified in CSI-RS index field 412a, the frequency resource reconfiguration (FRR) information is identified in FRR field 414a and the time resource reconfiguration (TRR) information is identified in TRR field 416a. For a second beam, the reference signal index (i.e. for a CS-RS) is identified in CSI-RS index field 412b, the frequency resource reconfiguration information is identified in FRR field 414b and the time resource reconfiguration information is identified in TRR field 416b. For a third beam, the reference signal index (i.e. for a CS-RS) is identified in CSI-RS index field 412c, the frequency resource reconfiguration information is identified in FRR field 414c and the time resource reconfiguration information is identified in TRR field 416c. For a fourth beam, the reference signal index (i.e. for a CS-RS) is identified in CSI-RS index field 412d, the frequency resource reconfiguration information is identified in FRR field 414d and the time resource reconfiguration information is identified in TRR field 416d. Several additional fields 418 are included that are reserved for other information. However, there may not necessarily be reserved fields in all implementations. FIG. 4E is a particular example of a MAC-CE command 400, but other examples of a MAC-CE command may include additional fields, the fields shown in FIG. 4E arranged in different order, and/or multiple instances of a same field type.

Figure 4F:
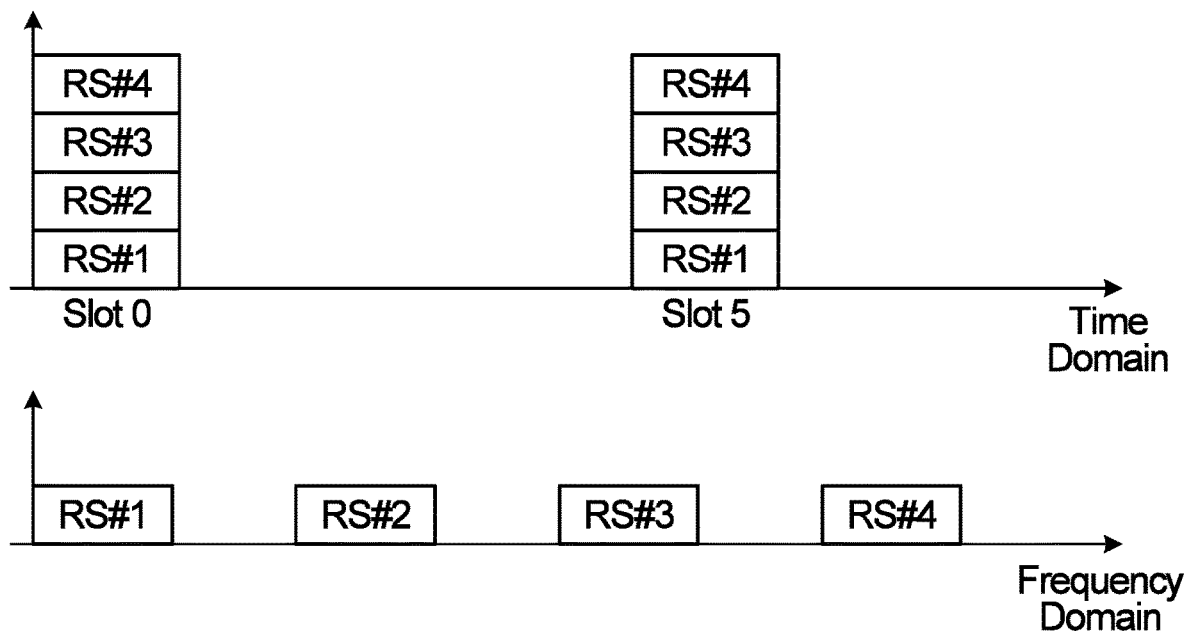
FIG. 4F is an example of a time domain representation of reference signals for respective beams of a second cell and a frequency domain representation of the same reference signals that could be configured to be monitored by a UE according to an aspect of the present disclosure.

Based on the contents of the fields of the mobility MAC-CE command 400 shown in FIG. 4E, which apply the particular indices for frequency and time resource reconfiguration fields from FIGS. 4C and 4D, the UE's internal MBM-RS configuration can be updated to monitor for reference signals having the time domain and frequency domain resource characteristics as shown in FIG. 4F.

FIG. 4F shows a time domain representation (the top graphical plot in FIG. 4F having increasing time along the horizontal axis) and a frequency domain representation (the bottom graphical plot in FIG. 4F having various frequency bands along the horizontal axis) of the reference signals. In the time domain representation, reference signals RS #1, RS #2, RS #3 and RS #4 are all shown occupying a Slot 0. The reference signals are repeated in the same manner in slot 5. In the frequency domain representation (various frequency bands along the horizontal axis), reference signals RS #1, RS #2, RS #3 and RS #4 are shown occupying four bandwidth portions with bandwidth gaps in between the bands.

FIG. 4G is an example of configuration information, in a similar hierarchy arrangement as FIG. 4B, used by a UE to enable the UE to configure itself to identify reference signals transmitted by the network via a serving base station or a neighboring base station that could be measured by the UE. For each of four beams, for example beams 95a, 95b, 95c and 95d of neighbor cell 95 of FIG. 1E, the reference signals to be measured are identified in terms of a reference signal resource identifier (for example CSI-RS-ResourceID), a scrambling identifier (scramblingID), periodicity and offset information, and resource mapping information. The periodicity and offset (which define how often the reference signal is repeated and an offset from a designated starting symbol) are defined by periodicity in terms of the particular slot where the reference signal re-occurs, identified here by the parameter slots5 for identifying slot of a group of five repeating slots, and an offset with respect to the first OFDM symbol (firstOfdmSymbol) value. In FIG. 4G, for the first reference signal, CSI-RS-ResourceID=1, having a scramblingID=57, the periodicity and offset are defined by slots5=0 and the firstOfdmSymbol value=0, and the frequency band mapping information is defined by a startingRB=10 and the numberofRBs used is 24. For the second reference signal, CSI-RS-ResourceID=2, having a scramblingID=57, the periodicity and offset are defined by slots5=0 and the firstOfdmSymbol value=0, and the frequency band mapping information is defined by a startingRB=70 and the numberofRBs used is 24. For the third reference signal, CSI-RS-ResourceID=3, having a scramblingID=57, the periodicity and offset are defined by slots5=0 and the firstOfdmSymbol value=0, and the frequency band mapping information is defined by a startingRB=130 and the numberofRBs used is 24. For the fourth reference signal, CSI-RS-ResourceID=4, having a scramblingID=57, the periodicity and offset are defined by slots5=0 and the firstOfdmSymbol value=0, and the frequency band mapping information is defined by a startingRB=190 and the numberofRBs used is 24.

Figure 4H:
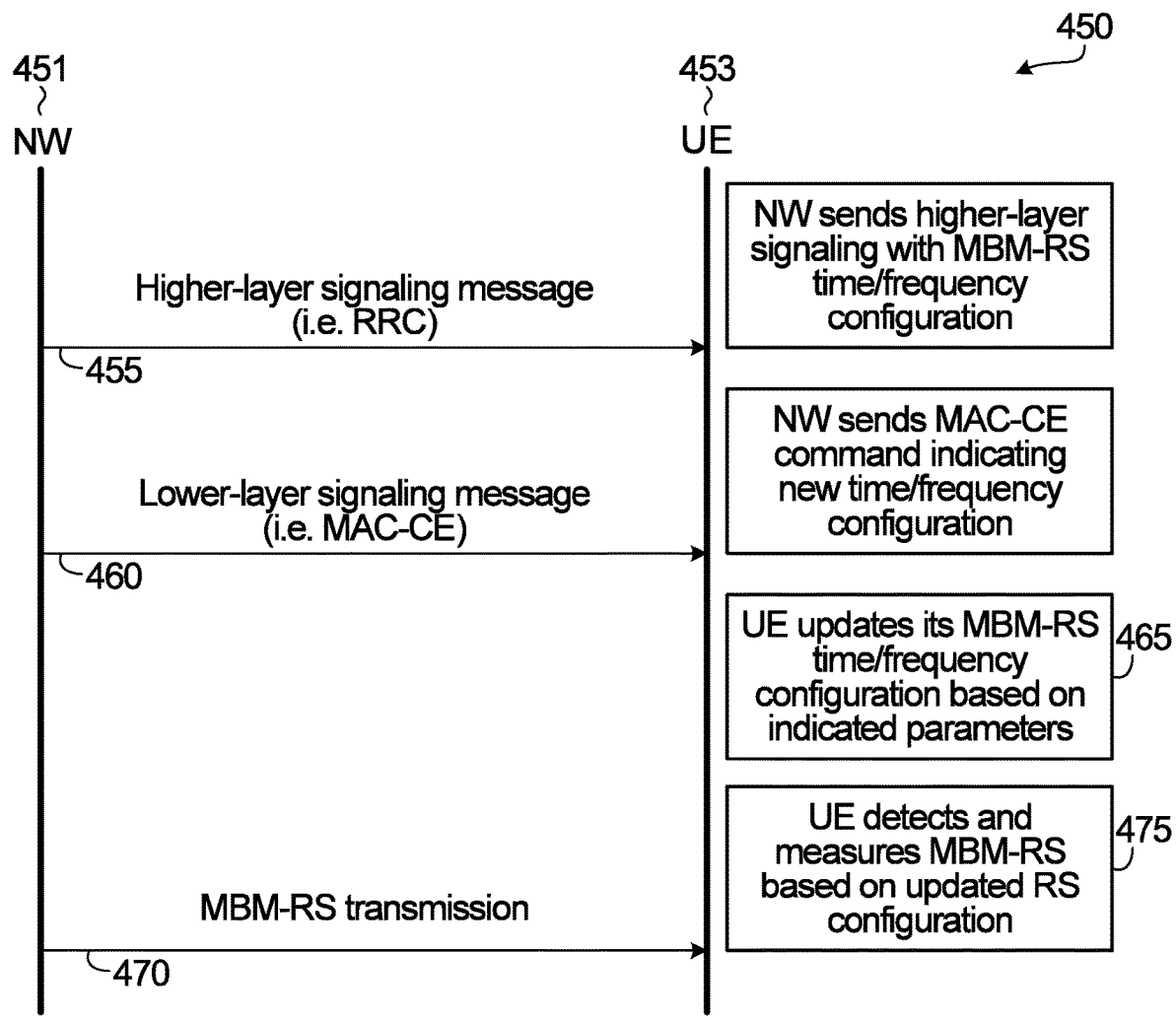
FIG. 4H is a flow diagram illustrating an example process of using Layer 1/Layer 2 (L1/L2) signaling for enabling inter-cell mobility according to an aspect of the present disclosure.

FIG. 4H is an example signaling diagram 450 of signaling (i.e. messages) being exchanged between the network (NW) 451 and one UE 453 of the one or more UEs being served by network 451, as well as behavior in response to having received messages from the network 451. The network 451 includes a serving cell that is serving one or more UEs including the UE 453 and at least one neighbor cell of the serving cell. The network 451 as represented in FIG. 4H includes multiple cells. As described with reference to FIG. 1E, from the perspective of a given UE, there is a serving cell that serves the UE and other cells, that are adjacent to the serving cell that are considered neighbor cells to the serving cell. The serving cell may send higher layer and lower layer signaling messages to the UE. Both the serving cell and the neighbor cells can transmit mobility beam management reference signals to the UE 453.

The network 451 (via a serving cell that is serving the UE 453 and/or a neighbor cell of the source cell) sends (i.e. transmits) 455 higher layer signaling (i.e. a higher layer message) to the UE 453, such as RRC signaling (i.e. a RRC message) with mobility beam management reference signal (MBM-RS) configuration information for the UE 453. The higher layer signaling (i.e. the higher-layer message) may be a Layer 3 (L3) signaling (i.e. a L3 message). The network 451 (via the serving cell or neighbor cell) sends 460 a lower layer signaling (i.e. a lower-layer message), in the form of L1 signaling (i.e. a L1 message) or L2 signaling (i.e. a L2 message), to the UE 453, such as a MAC-CE command (e.g. MAC-CE command 400) that includes additional configuration information in the form of time-frequency MBM-RS configuration information. The UE 453 may send (not shown) via the serving cell or neighbor cell a MAC-CE acknowledgement to the network 451 indicating that the UE 453 has successfully received the MAC-CE command (e.g. MAC-CE command 400). The UE 453 updates 465 the MBM-RS time/frequency configuration information based on the information in the MAC-CE command. The network 451 sends 470 MBM-RS, which may be at least one of the serving cell sending MBM-RS and the neighbor cell sending MBM-RS. Based on the MAC-CE command (e.g. MAC-CE command 400), the UE 453 detects and measures 475 the MBM-RS sent by the network 451 via the serving cell or neighbor cell based in the new time-frequency MBM-RS configuration information in the MAC-CE command (e.g. MAC-CE command 400).

The following describes how the UE may apply the content of the mobility MAC-CE command to modify its internal RRC configuration. An example of such a MAC-CE command is shown on FIG. 4E (e.g. MAC-CE command 400). The MAC-CE command provides the scrambling identity field that is common to all sub-sequent CSI-RS indexes. For CSI-RS index 1, the UE applies the fields given for CSI-RS index 1 as follows:

Scrambling Identity—the UE updates its scrambling identity field to 57.

Frequency Resource Reconfiguration (FRR)—the UE updates its frequency configuration for CSI-RS index 1 with the information given in the row matching FRR=0, i.e. referring to FDD index from FIG. 4C, the StartingRB field is 10 and the RS bandwidth field is 24.

Time Resource Reconfiguration (TRR)—the UE updates its timing configuration for CSI-RS index 1 with the information given in the row matching TRR=2, i.e. referring to TDD index from FIG. 4D, the firstOFDMSymbolinTimeDomain field is 0, slotPeriodicity is 5 and slotOffset is 0.

A similar process is applied for CSI-RS index 2 412b, CSI-RS index 3 412c and CSI-RS index 4 412d. Once the information in the mobility MAC-CE command (e.g. MAC-CE command 400) has been applied at the UE, because the reconfiguration of the CSI-RS changed the scrambling identity used by the CSI-RS, the UE is now configured to detect and measure the MBM-RSs being transmitted by the neighbor cell. Effectively, this means that the UE is no longer tracking reference signals sent by the serving cell, but is instead tracking reference signals sent by the neighbor cell.

Embodiments described above constitute a simplified method for resource configuration. As part of inter-cell mobility procedures, reference signals are typically reconfigured during handover using RRC reconfiguration. However, reference signal configurations between different base stations in serving cell or neighbor cells are often not drastically different in their content. This enables using the disclosed reconfiguration mechanisms. In some embodiments, time and frequency resources used by a reference signal may be derived using pre-defined tabulated values.

The use of a reconfiguration according to embodiments of the present disclosure enables using tables with pre-defined values for time and/or frequency configurations, allowing the UE to quickly update its internal MBM-RS configuration. The reduced flexibility resulting from providing frequency and time domain configuration information associated with predefined reconfiguration indices may lead to low overhead mobility commands. Lower overhead requirements allow the network to initiate such commands directly at the physical layer and/or MAC layer, which should reduce latency.

The following embodiment gives a detailed example of resource reconfiguration for a UE based on event based reporting for mobility beam management.

The UE is configured with MBM-RS configuration information that enables the UE to report measurement information to the network, via a serving cell or neighbor cell, based on results of a particular event. An example of an event may be a first beam having a signal strength that is higher than a second beam by a threshold amount for a defined duration.

The MBM-RS configuration information may be a combination of information provided to the UE in lower layer signaling, such as L1 and/or L2 signaling (i.e. L1 and/or L2 messages), and higher layer signaling, such as L3 signaling (i.e. L1 and/or L2 messages). L1 and/or L2 signaling (i.e. L1 and/or L2 messages) can be used to provide the UE MBM-RS configuration information that may change more frequently and L3 messages can be used to provide the UE MBM-RS configuration information that may change less frequently. Examples of information that may be provided using L1 and/or L2 signaling (i.e. L1 and/or L2 messages) includes the configuration information that defines the reference signal resources that are to be monitored by the UE. Examples of information that may be provided using L3 signaling (i.e. L1 and/or L2 messages) includes the particular type of signal to be measured, a threshold value, and a duration.

Events may occur as a UE moves from a coverage area of a serving cell towards a coverage area of a neighbor cell. As described with regard to FIG. 1E, serving and neighbor cells may have multiple beams and the path of a UE may take the UE in close proximity to beams of different cells.

Embodiments will now be described with specific reference to FIG. 1E, the UE 97 is configured with MBM-RS configuration information defining the four MBM-RSs (on beams 90a, 90b, 90c, and 90d) used by the serving gNB 91 and the four MBM-RSs (on beams 95a, 95b, 95c, and 95d) used by the neighbor gNB 96.

FIG. 5A is an example of MBM-RS configuration information for MBM-RS #1-4 (on beams 90a, 90b, 90c, and 90d) for the serving gNB 91 and of MBM-RS configuration information for MBM-RS #1-4 (on beams 95a, 95b, 95c, and 95d) for the neighbor gNB 96. The contents of FIG. 5A are similar to the contents of the MBM-RS configuration information found in FIGS. 4B and 4G without the periodicity and offset information found in FIG. 4G and with different values in the frequency band information.

As the UE 97 is travelling along path 93 in FIGS. 1E and 1s located at location 98, indicated by a star in the figure, the UE 97 is at a position where it is in close proximity to beam 90c of serving gNB 91 and beam 95b of neighbor gNB 96. Therefore, an event may correspond to measuring the strength of these two beams and if a difference between a strength of the reference signal on beam 95b and a strength of the reference signal on beam 90c, exceeds a threshold value for a duration of time, this event is reported to the network.

An example of a MBM-RS configuration information hierarchy, similar to that described in FIG. 4B, for example, for defining the event and resource involved is shown in FIG. 5B. The event is defined as "MBM1" in Level 3 in FIG. 5B. A first reference resource signal (resource 1) is defined using a reference signal resource ID (CSI-RS-ResourceID=2) and scrambling identifier (scramblingId=57). This information corresponds to the MBM-RS configuration information 520 for RS #2 identified in FIG. 5A. A second reference resource signal (resource 2) is defined using a reference signal resource ID (CSI-RS-ResourceID=3) and scrambling identifier (scramblingId=9). This information corresponds to the MBM-RS configuration information 510 for RS #3 identified in FIG. 5A. The type of signal to be measured (meas) is identified as reference signal received power (RSRP), the threshold value (threshold-dB) is indicated to be 3 dB and the duration (duration-ms) is indicated to be 20 milliseconds. Examples of other types of signals (measQuantity) that could be measured are RSRQ (Reference Signal Received Quality) and SINR (Signal to Interference and Noise Ratio)

In some embodiments according to this disclosure, the network can update the values of resource1 and resource2 using lower layer signaling, such as L1/L2 signaling, as different beam events become more relevant as the UE moves.

Based on the event defined in FIG. 5B, UE behavior involves detecting and measuring RS #3, as defined by the MBM-RS configuration information 510 in FIG. 5A, and RS #2, as defined by the MBM-RS configuration information 520 in FIG. 5A, and sending a report to the network, via the serving cell or the neighbor cell, if event MBM1 is triggered, i.e. if the RSRP of resource 1 (RS #2 using scramblingId=57) is higher than the RSRP of resource 2 (RS #3 using scramblingId=9) for a duration of 20 ms by a threshold of 3 dB.

While the example above describes a particular situation of a MBM-RS on a first resource having a larger RSRP than a MBM-RS on a second resource by a threshold value for a particular duration, this is not intended to be the only event that is possible. Other embodiments for which MBM-RS configuration information may be provided to the UE and corresponding events that can be monitored for and reported include, for example, a MBM-RS on a first resource is stronger than threshold T for a duration D, a MBM-RS on a first resource on a first antenna panel P1 is stronger than a MBM-RS on a second resource on a first antenna panel P1 than threshold T for a duration D, and a MBM-RS on a first resource on a first antenna panel P1 is stronger than a MBM-RS on a second resource on a second antenna panel P2 than threshold T for a duration D.

Figure 5C:
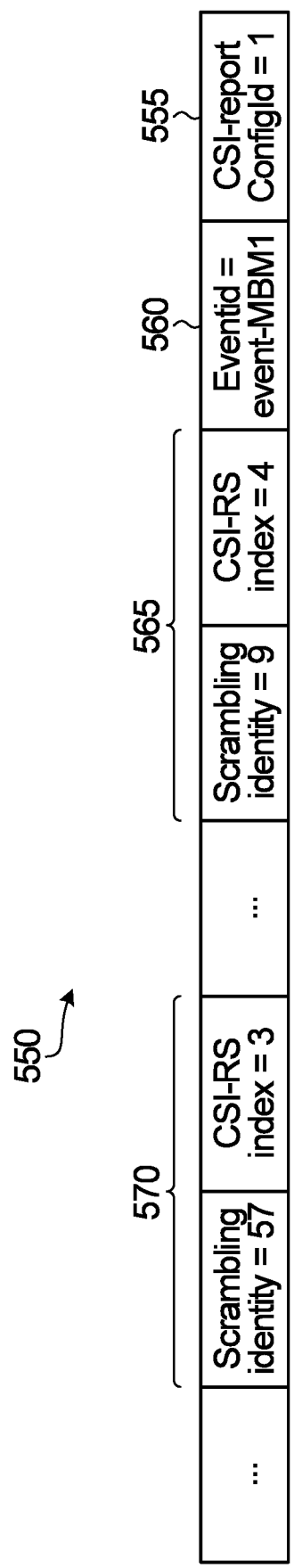
FIG. 5C is an example of a MAC-CE command for use in configuring event information pertaining to multiple reference signals for inter-cell mobility according to an aspect of the present disclosure.

Referring again the event illustrated in FIG. 5B, in a situation that the UE does not report that RS #2 is better than RS #3, when at position 98, i.e. the event is not triggered, and the UE is still served by serving gNB 91, the network, via the serving cell or the neighbor cell, sends a MAC-CE command, such as MAC-CE command 550 descried in FIG. 5C, to update the MBM event to a new event as the UE continues along the path 93. For example, when the UE 97 is located where it is shown in FIG. 1E, the UE is in proximity to beam 90d of serving gNB 91 and beam 95c of the neighbor gNB 96.

The MAC-CE command, i.e. MAC-CE command 550 descried in FIG. 5C, updates resource1 and resource2 fields. In some embodiments, this may involve using a field of multiple bits that identify a RS index and a scrambling identity.

FIG. 5C illustrates an example of a format for a MAC-CE command 550. MAC-CE command 550 includes a field 555 for identifying a reference signal configuration index (labeled as CSI-report ConfigID), which in this example is indicated to be equal to 1. An identification of an event identifier (labelled as EventId) is indicated in field 560 as event-MBM1. Fields 565 and 570 are examples of configuration for the reference signal index (CSI-RS Index) and scrambling identity (Scrambling identity) to define particular beams involved in the event.

FIG. 5D shows another example of defining an event and resource involved that is similar to FIG. 5B, except that FIG. 5D pertains to resource1 being RS #3, as defined by the MBM-RS configuration information 524 in FIG. 5A, and resource2 being RS #4, as defined by the MBM-RS configuration information 515 in FIG. 5A. In some embodiments, the MBM-RS configuration information for the type of signal being measured (labelled in FIG. 5D as measQuantity), threshold (labelled in FIG. 5D as threshold-dB) and duration (labelled in FIG. 5D as duration-ms) are not dynamically or semi-statically updated, but the MBM-RS configuration is updated using L3 signaling (i.e. L3 messages).

Upon reception of the MAC-CE command, i.e. MAC-CE command 550 descried in FIG. 5C, the MBM-RS configuration information corresponding to "event-MBM1" is updated in the UE as shown in FIG. 5D and resource1 and resource2 correspond to reference signal information 525 for RS #3 and reference signal information 515 for RS #4, respectively, in FIG. 5A.

Following reception of the MAC-CE command, i.e. MAC-CE command 550 descried in FIG. 5C, UE behavior involves detecting and measuring RS #4 on beam 90d and RS #3 on beam 95c, and sending a report to the network if event MBM1 is triggered, i.e. if the RSRP of resource 1 (RS #4 using scramblingId=9) is larger than the RSRP of resource 2 (RS #3 using scramblingId=57) for a duration of 20 ms by a threshold of 3 dB.

In some embodiments, if the UE is configured with MBM-RS configuration information defining a mobility beam-based event, then the UE can be considered to be performing "monitoring a mobility beam event". The monitoring of the mobility beam event includes the UE monitoring a MBM-RS in the sense that the UE is attempting to detect and measure that reference signal. Similarly, if the UE is configured with a mobility beam-based event, the UE monitors a mobility beam-based event in the sense that it is attempting to detect and measure the MBM-RS indicated by the mobility beam-based event, based on the thresholds and criteria defined in the mobility beam-based event.

Figure 5E:
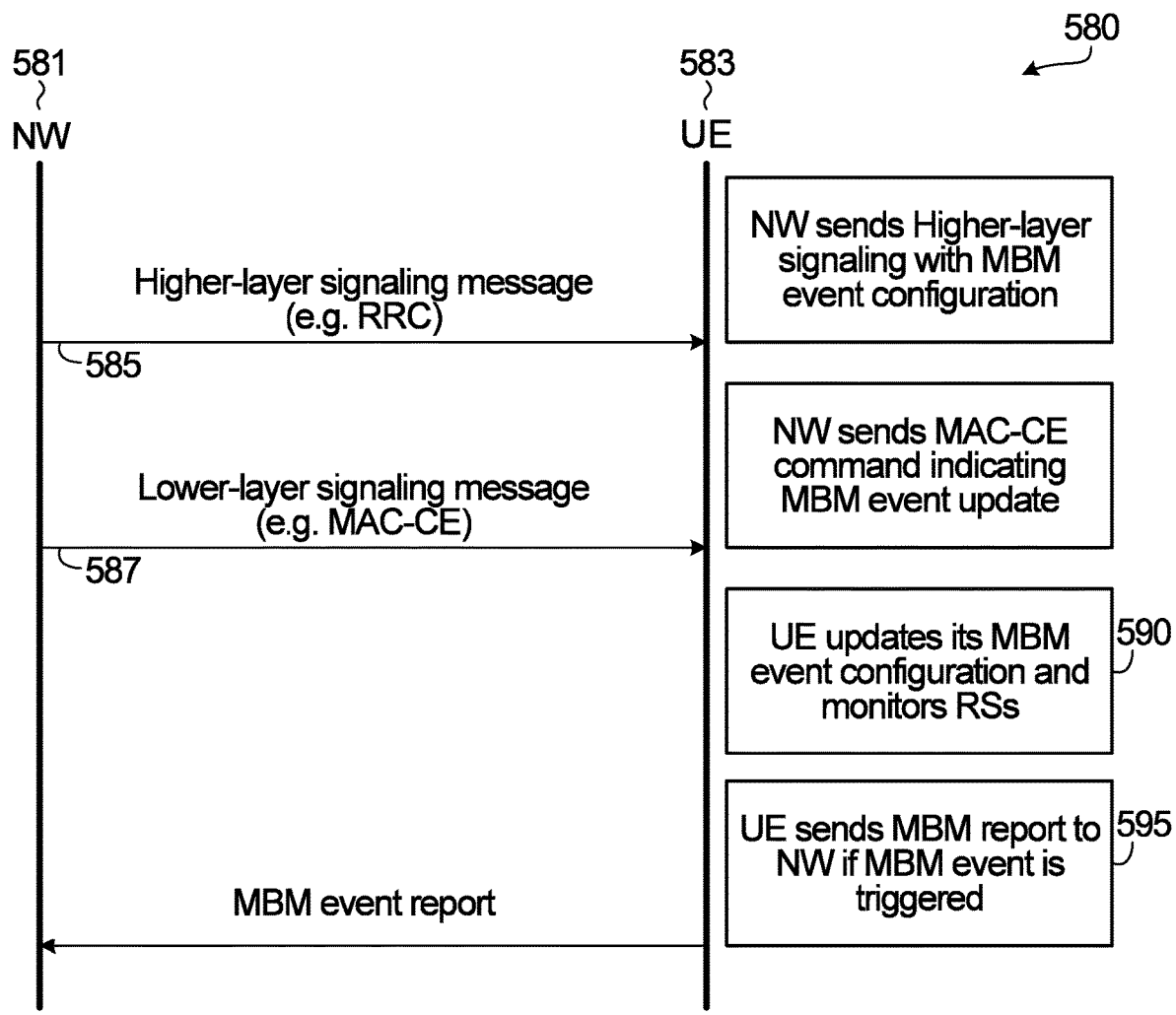
FIG. 5E is an example is a flow diagram illustrating an example process of using L1/L2 signaling for enabling inter-cell mobility according to an aspect of the present disclosure.

FIG. 5E is an example signaling diagram 580 of signaling (i.e. messages) being exchanged between the network (NW) 581 and one UE 583 of one or more UEs being served by network 581, as well as behavior in response to having received messages from the network 581. The network 581 includes a serving cell that is serving one or more UEs, including the UE 583, and at least one neighbor cell of the serving cell. The serving cell may send higher layer signaling and lower layer signaling (i.e. higher layer and lower layer messages) to the UE. Both the serving cell and the neighbor cells can transmit mobility beam management reference signals to the UE 583.

The network 581, via the serving cell and/or the neighbor cell, sends (i.e. transmits) 585 higher layer signaling (i.e. higher layer message) to the UE 583, such as RRC signaling (i.e. an RRC message) with MBM-RS configuration information for the UE 583. The higher layer signaling (i.e. higher layer message) may be Layer 3 signaling (i.e. a Layer 3 message). The network 581, via the serving cell and/or the neighbor cell, sends 587 a lower layer signaling (i.e. lower layer message), in the form of L1 signaling (i.e. an L1 message) or L2 signaling (i.e. an L2 message), to the UE 583, such as a MAC-CE command, i.e. MAC-CE command 550 descried in FIG. 5C, that includes additional configuration information in the form of MBM event configuration information. The UE 583 may send (not shown) a MAC-CE command acknowledgement to the network 581 indicating that the UE 583 has successfully received the MAC-CE command. The UE 583 updates 590 the MBM-RS event configuration based on the information in the received MAC-CE command and monitors MBM-RS that may be received from the network, via the serving cell and neighbor cell identified in the MBM event configuration. The network 581 sends MBM-RS (not shown), which may be at least one of the serving cell sending MBM-RS and the neighbor cell sending MBM-RS. Based on the MBM event configuration information, the UE 583 detects and measures the MBM-RS sent by the network 581 (not shown). The UE 583 sends 595 an MBM report to the network if the condition of the MBM event such as defined in the MBM event configuration information are triggered, i.e. a measurement type that is being monitored exceeds a threshold for a particular duration.

The following embodiment relates to semi-static beam-set indication and ordering for mobility beam management gives a detailed example of resource configuration involving semi-static beam set indication and ordering for a UE.

The UE is provided with configuration information that enables the UE to update reference signal information in a semi-static manner and provides beam-set information including a weigh value to enable the UE to determine the importance of the reference signals and thus the UE can determine which reference signal may be detected.

This embodiment will once again be described with an example that specifically refers to the arrangement of FIG. 1E, in which the UE is configured with information defining the four MBM-RSs (on beams 90a, 90b, 90c, and 90d) used by the serving gNB 91 and the four MBM-RSs (on beams 95a, 95b, 95c, and 95d) used by the neighbor gNB 96.

The contents of the MBM-RS configuration information shown in FIG. 5A is also applied here as an example of the configuration information for MBM-RS #1-4 (on beams 90a, 90b, 90c, and 90d) for the serving gNB 91 and of configuration information for MBM-RS #1-4 (on beams 95a, 95b, 95c, and 95d) for the neighbor gNB 96.

In this example, in a situation when the UE 97 is located where it is shown to be located in FIG. 1E, the UE 97 is in proximity to beam 90d of serving gNB 91 and beams 95b and 95c of neighbor gNB 96. The network sends a MAC-CE command, such as MAC-CE command 600 in FIG. 6A and MAC-CE command 650 in FIG. 6B for mobility beam management indicating a beam-set on which the UE is expected to perform detection, measurement and reporting.

FIG. 6A is an example of the contents of a MAC-CE command 600. The MAC-CE command 600 includes pairs of fields that provide the identification of the resources to be monitored. In the example of FIG. 6A, fields 610 and 615 provide the identification of RS #3, as identified by information 525 in FIG. 5A, on beam 95c in the form of reference signal index (labelled as CSI-RS index) equal to 3 that has a scrambling identity of 57. Fields 620 and 625 provide the identification of RS #4, as identified by information 515 in FIG. 5A, on beam 90d in the form of CSI-RS index equal to 4 that has a scrambling identity of 9. Fields 630 and 635 provide the identification of RS #2, as identified by information 520 in FIG. 5A, on beam 95b in the form of CSI-RS index 2 that has a scrambling identity of 57.

Following reception of the MAC-CE command, i.e. MAC-CE command 600 described in FIG. 6A, the UE performs detection, measurement and reporting on the indicated beam-set. With respect to the example being described, based on the contents of the MAC-CE command, i.e. MAC-CE command 600 described in FIG. 6A, the UE 97 is expected to detect, measure and report beam quality for RS #3 using scramblingId=57, RS #4 using scramblingId=9 and RS #2 using scramblingId=57

In some embodiments, where a particular set of reference signals are identified, the UE is not expected to detect, measure or report beam quality for other reference signals that are not in the indicated beam-set of the MAC-CE command.

In some embodiments, the reference signals in the beam-set are ordered in a particular order that indicates priority. One example may involve the fields in the MAC-CE command being arranged in a decreasing order of priority. In the example of the beam-sets in the MAC-CE command 600 in FIG. 6A, a decreasing order of priority occurs in the pairs of fields being arranged from right to left. However, it is understood that the arrangement could be any preferred arrangement that is known to both the network and UEs.

The priority rules can be based on the priority of parameters, wherein the parameters may be one or more of RSRP, Likelihood Ratio, RS Conditional Probability, RS weight, RS periodicity, reporting periodicity, RS frequency location, RS index, and RS position within indicated beam-set.

There are multiple ways in which reference signal detection events are identified. Several examples are described below.

A first example involves applying a RSRP threshold, in particular a detection event occurs when the detected RSRP is greater than a RSRP threshold.

A second example involves applying a likelihood ratio threshold, in particular a detection event occurs when a ratio of likelihood values, for example considering two reference signals RS #3 and RS #4, $(P\{y|x=RS\ \#3\}/P\{y|x=RS\ \#4\})$ is greater than a likelihood ratio threshold.

A third example involves applying a conditional probability threshold, in particular a detection event occurs when a conditional probability $P\{y|x=RS\}$, for example considering a reference signal RS #3, $P\{y|x=RS\ \#3\}$, is greater than a conditional probability (P) threshold.

In some embodiments of how semi-static beam-set indication may be implemented, the network sends a MAC-CE command that indicates beam-sets on which the UE is expected to perform detection, measurement and reporting.

FIG. 6B is an example of contents of a MAC-CE command 650 that includes reference signal weighting. For example, weight values may range from 1 to 4, wherein, 1 is a lowest weight value and 4 is highest weight value. Such weight values are merely by way of example and it is to be understood that these weight values could be any desired range of values. Following reception of the MAC-CE command, i.e. MAC-CE command 650 described in FIG. 6B, the UE performs detection, measurement and reporting on the indicated beam-set.

Sets of three fields in the example of the MAC-CE command 650 described in FIG. 6B provide the identification of the resources to be monitored and the weight value for the set. Fields 655, 660 and 665 provide the identification of RS #1 on beam 90a shown in the example of FIG. 1E in the form of CSI-RS index=1 that has a scrambling identity=9 and a weight value=1. The set of fields 670 provides the identification of RS #2 on beam 90b shown in the example of FIG. 1E in the form of CSI-RS index=2 that has a scrambling identity=9 and a weight value=2. A next set of three fields provides the identification of RS #3 on beam 90c shown in the example of FIG. 1E in the form of CSI-RS index=3 that has a scrambling identity=9 and a weight value=3. A next set of three fields provides the identification of RS #4 on beam 90d shown in the example of FIG. 1E in the form of CSI-RS index=4 that has a scrambling identity=9 and a weight value=4. A next set of three fields provides the identification of RS #1 on beam 95a shown in the example of FIG. 1E in the form of CSI-RS index=1 that has a scrambling identity=57 and a weight value=1. A next set of three fields provides the identification of RS #2 on beam 95b shown in the example of FIG. 1D in the form of CSI-RS index=2 that has a scrambling identity=57 and a weight value=3. A next set of three fields provides the identification of RS #3 on beam 95c shown in the example of FIG. 1E in the form of CSI-RS index=3 that has a scrambling identity=57 and a weight value=4. A next set of three fields provides the identification of RS #4 on beam 95d shown in the example of FIG. 1D in the form of CSI-RS index=4 that has a scrambling identity=57 and a weight value=2.

Three different examples are included below illustrating UE behavior for three different types of MBM events for the particular situation of the weights shown in FIG. 6B for a UE 97 located as shown in FIG. 1E.

In a first example, an MBM event's weight is calculated as the sum of the CSI-RS weights of the reference signals involved in the event. An MBM event involving RS #3 using scramblingId=57 and RS #4 using scramblingId=9 has a combined CSI-RS weight equal to 8 because the CSI-RS weight of each of these respective reference signals is 4. An MBM event involving RS #2 using scramblingId=9 and RS #2 using scramblingId=57 has a combined CSI-RS weight equal to 5 because the weight of these reference signals is 2 and 3, respectively. The event with the highest weight is the event to be considered the most important at that time, and until event information is updated again.

In a second example, different MBM events are ranked based on their CSI-RS weight. The UE is expected to monitor events whose CSI-RS weight is higher than a particular CSI-RS weight threshold (e.g. 6). For the particular position of UE 97 in FIG. 1E, the UE is expected to detect, measure and report beam quality for RS #3 using scramblingId=57, RS #4 using scramblingId=9 and RS #2 using scramblingId=57. In this particular location, RS #3 using scramblingId=57 and RS #4 using scramblingId=9 have a combined CSI-RS weight of 6 and RS #4 using scramblingId=9 and RS #2 using scramblingId=57 have a combined weight of 6.

In a third example, for every value w of CSI-RS weight for a reference signal, the UE adds w−1 dB to a corresponding measurement for that reference signal. This results in the UE adding a positive offset indicated by the network to the measurement of the corresponding reference signal, thus giving the reference signal an advantage against other reference signals.

Figure 6C:
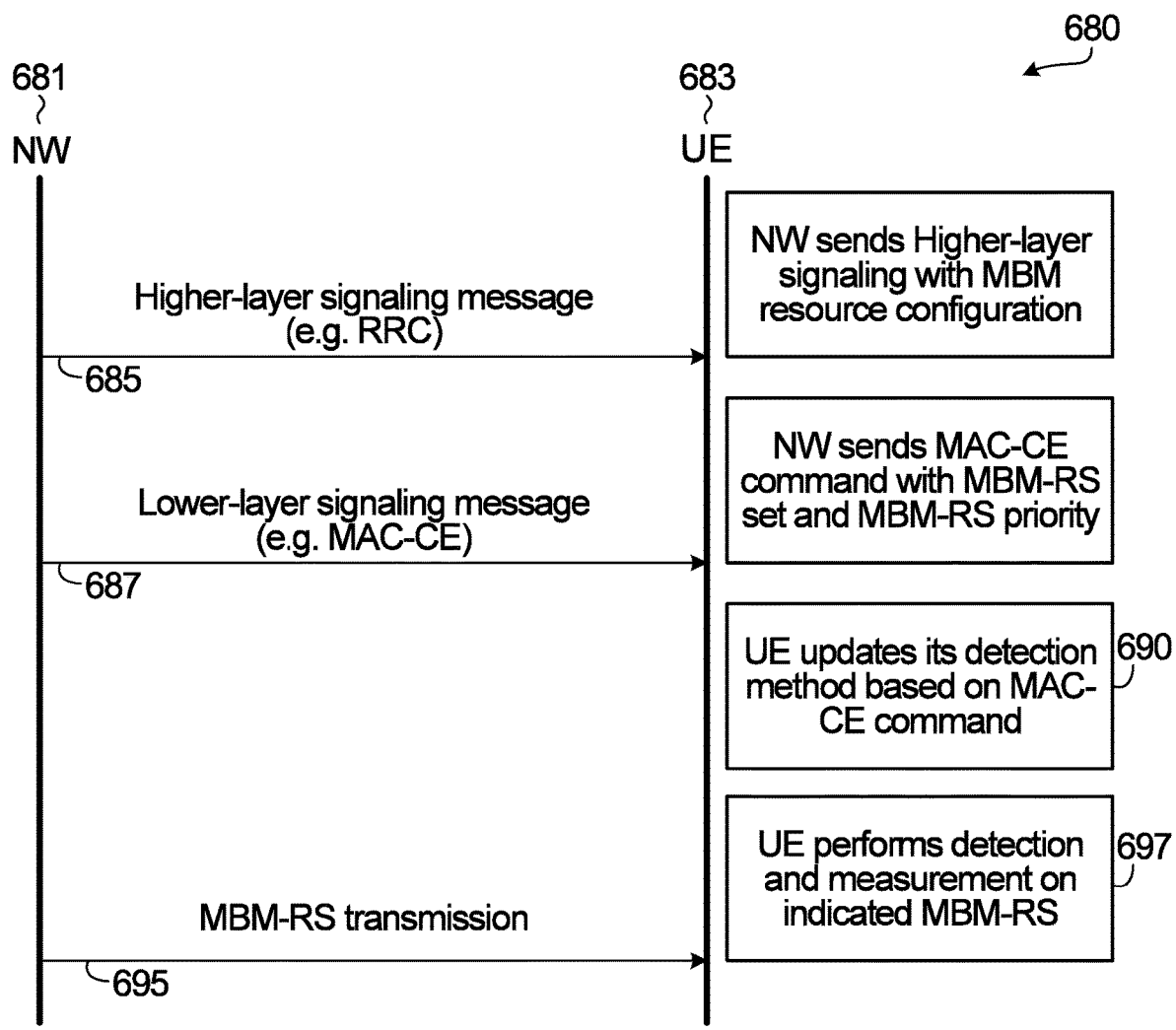
FIG. 6C is yet another flow diagram illustrating an example process of using L1/L2 signaling for enabling inter-cell mobility according to an aspect of the present disclosure.

FIG. 6C is an example signaling diagram 680 of messages being exchanged between the network (indicated by NW in FIG. 6C) 681 and one UE 683 of one or more UEs being served by network 681, as well as behavior in response to having received messages from the network 681. The network 681 includes a serving cell that is serving one or more UEs, including the UE 683, and at least one neighbor cell of the serving cell. The serving cell may send higher layer and lower layer signaling (i.e. higher layer and lower layer messages) to the UE. Both the serving cell and the neighbor cells can transmit mobility beam management reference signals to the UE 683.

The network 681 sends 685 higher layer signaling (i.e. higher layer message) to the UE 683, such as RRC signaling (i.e. an RRC message) with MBM-RS configuration information for the UE 683. The higher layer signaling (i.e. higher layer message) may be Layer 3 signaling (i.e. a Layer 3 message). The network 681 sends 687 lower layer signaling (i.e. lower layer message), in the form of Layer 1 signaling (i.e. an L1 message) or Layer 2 signaling (i.e. an L2 message), to the UE 683, such as a MAC-CE command, i.e. MAC-CE command 600 described in FIG. 6A or 650 in FIG. 6B) that includes additional configuration information in the form of MBM resource configuration information.

The UE 683 may send (not shown) a MAC-CE acknowledgement to the network 681 indicating that the UE 683 has successfully received the MAC-CE command, i.e. MAC-CE command 600 described in FIG. 6A or 650 in FIG. 6B). The network 681 sends 695 MBM-RS, which may be at least one of the serving cell sending MBM-RS and the neighbor cell sending MBM-RS. Based on the event configuration information, the UE 683 detects and measures 697 the MBM-RS sent by the network 681.

Another aspect of the disclosure involves L1/L2-based UL resource reconfiguration for reporting for mobility beam management, including configuration of an UL resource to be used by the UE to report information pertaining to mobility beam management, in particular beam reference signal reporting.

Upon completing initial access to the network, the UE acquires a default UL PUCCH resource for sending MBM-RS based reports. In some embodiments, the information defining the UL PUCCH may be acquired through system information, such as the master information block (MIB). An example of a configuration information element (IE) that may be part of the MIB broadcast by serving gNB 91 in FIG. 1E, for providing information to the UE is shown in FIG. 7A and labelled as PUCCH-ConfigMBM. The name PUCCH-ConfigMBM is being used in this disclosure as an identification of the type of configuration being described, but it is to be understood that this name is not intended to limit the intended scope of the configuration information This configuration IE that is part of the MIB and that is shown in FIG. 7A has a hierarchical structure like other IEs described above, for example FIG. 4B. The information included in the configuration IE shown in FIG. 7A includes fields for PUCCH Resource Set Zero (PUCCHResourceSetZero), PUCCH Resource Zero (PUCCHResourceZero), PUCCH-Power Control and PUCCH-Format.

PUCCH Resource Set Zero (PUCCHResourceSetZero) designates a default set of UL resources to be used for PUCCH transmissions carrying mobility beam management reports. This default set of PUCCH resources is indicated to UEs as part of the system information (e.g. MIB) and a value range of the PUCCH Resource Set Zero is known to the UE. The PUCCHResourceSetZero field is set equal to 0 in this example. This value of 0 is an index value that corresponds to one or more specific parameters associated with the PUCCH Resource Set Zero. PUCCH Resource Zero (PUCCHResourceZero) designates a default UL resource to be used for PUCCH transmission within Physical Uplink Resource Set #0 (PURESET #0) to be used for PUCCH transmissions carrying mobility beam management reports. This default PUCCH resource is indicated to UEs as part of the system information (e.g. MIB) and a value range of the PUCCH Resource Zero is known to the UE. The PUCCHResourceZero field is set equal to in this example. This value of 0 is an index value that corresponds to one or more specific parameters associated with the PUCCH Resource Zero. PUCCH-Power Control designates the default UL power control settings to be used for PUCCH transmissions carrying mobility beam management reports over PUCCH #0. This default PUCCH power control setting is indicated to UEs as part of the system information (e.g. MIB) and a value range of the PUCCH Power Control is known to the UE. The PUCCH-PowerControl field is set equal to 8 in this example. This value of 8 is an index value that corresponds to one or more specific parameters associated with the PUCCH power control of the PUCCH. PUCCH-Format designates the default PUCCH format to be used for PUCCH transmissions carrying mobility beam management reports over PUCCH #0. This default PUCCH format setting is indicated to UEs as part of the system information (e.g. MIB) and a value range of the PUCCH Format is known to the UE. The PUCCH-Format field is set equal to 4 in this example. This value of 4 is an index value that corresponds to one or more specific parameters associated with the PUCCH format. The particular values in the fields for the MAC-CE in FIG. 7A are not intended to be limiting, but are intended to show that the fields can include a value relevant to configuration information being provided in the MAC-CE command.

UE behavior after having received the UL resource reporting configuration information, and having performed detection and measurement functions that have generated information to be reported, involves the UE sending MBM-RS based reports over PUCCH #0 using parameters given in a configuration information element or message.

In some implementations, a default UL PUCCH resource, which may be identified as PUCCH #0, is monitored by each cell (i.e. serving cell or neighbor cell) for MBM-RS based reports from UEs that a cell serves or that may be from a UE served by a neighbor cell.

The UE may monitor MIB in one or more neighbor cells and store information indicated in the PUCCH-ConfigMBM for different neighbor cells.

Another example of a configuration IE that may be part of the MIB broadcast by neighbor gNB 96 in FIG. 1E, for providing information to the UE is shown in FIG. 7B, once again labelled as PUCCH-ConfigMBM. FIG. 7B includes the same information as FIG. 7B, but the values of the respective parameters are different than that in FIG. 7A because they reflect the information broadcast by neighbor gNB 96.

Figure 7C:
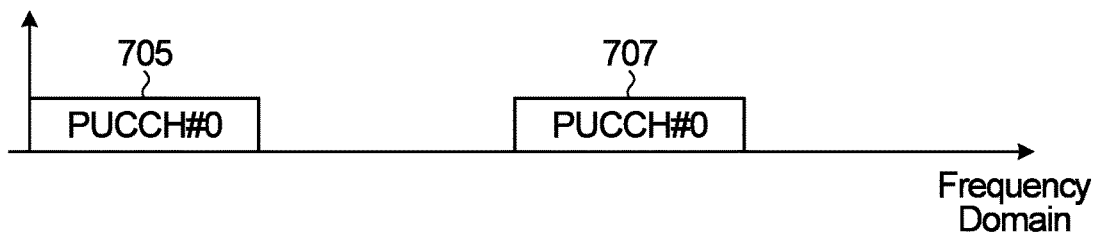
FIG. 7C is a frequency domain representation of the uplink channels configured in FIGS. 7A and 7B.

FIG. 7C illustrates an example of the PUCCH #0 bandwidth that is allocated for the UE to report information pertaining to mobility beam management in the frequency domain. In the frequency domain representation, PUCCH #0 705 is allocated for serving gNB 91 in FIG. 1E and PUCCH #0 707 is allocated for neighbor gNB 96 in FIG. 1E.

Figure 7D:
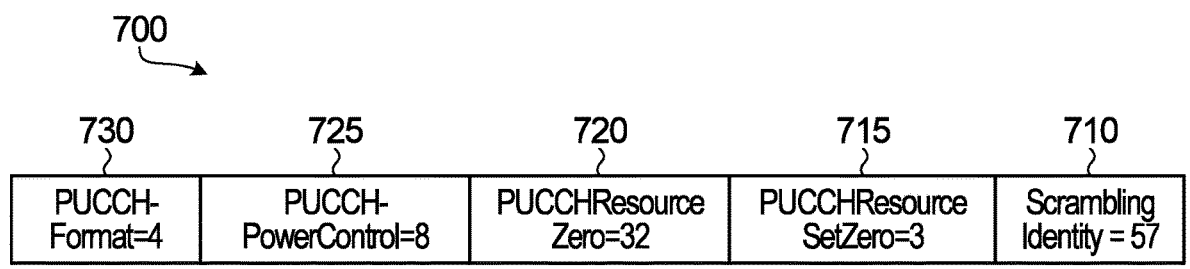
FIG. 7D is another example of a MAC-CE command for use in providing configuration information for an uplink channel to be used by a UE for transmitting beam reporting information according to an aspect of the present disclosure.

Referring once again to FIG. 1E, the serving gNB 91 sends an inter-cell mobility MAC-CE command to the UE 97, with updated PUCCH #0 configuration information for sending MBM-RS based reports. An example of a MAC-CE command format 700 sent to the UE 97 is shown in FIG. 7D. The MAC-CE command 700 contains information about a scrambling identity (Scrambling Identity), PUCCH resource set #0 (PUCCHResourceSetZero), PUCCH resource #0 (PUCCHResourceZero), PUCCH power control (PUCCH-PowerControl) and PUCCH format (PUCCH-Format). The scrambling identity is identified in the MAC-CE command 700 by a scrambling identity field 710. PUCCH Resource Set Zero (PURESET #0 or PUCCHResourceSetZero) designates a default set of UL resources to be used for PUCCH transmissions carrying mobility beam management reports. This default set of PUCCH resources is indicated to UEs as part of the system information (e.g. MIB) and a value range of the PUCCH Resource Set Zero is known to the UE. The PUCCH resource set #0 is identified in the MAC-CE command 700 by the PUCCHResourceSetZero field 715. The PUCCHResourceSetZero field 715 is set equal to 3 in FIG. 7D. This value of 3 is an index value that corresponds to one or more specific parameters associated with the PUCCH Resource Set Zero. PUCCH Resource Zero (PUCCH #0 or PUCCHResourceZero) designates a default UL resource to be used for PUCCH transmission within PURESET #0 to be used for PUCCH transmissions carrying mobility beam management reports. This default PUCCH resource is indicated to UEs as part of the system information (e.g. MIB) and a value range of the PUCCH Resource Zero is known to the UE. The PUCCH resource #0 is identified in the MAC-CE command 700 by the PUCCHResourceZero field 720. The PUCCHResourceZero field 720 is set equal to 32 in FIG. 7D. This value of 32 is an index value that corresponds to one or more specific parameters associated with the PUCCH Resource Zero. PUCCH Power Control designates the default UL power control settings to be used for PUCCH transmissions carrying mobility beam management reports over PUCCH #0. This default PUCCH power control setting is indicated to UEs as part of the system information (e.g. MIB) and a value range of the PUCCH Power Control is known to the UE. The PUCCH power control is identified in the MAC-CE command 700 by the PUCCHPowerControl field 725. The PUCCHPowerControl field 725 is set equal to 8 in FIG. 7D. This value of 8 is an index value that corresponds to one or more specific parameters associated with the PUCCH power control of the PUCCH. PUCCH Format designates the default PUCCH format to be used for PUCCH transmissions carrying mobility beam management reports over PUCCH #0. This default PUCCH format setting is indicated to UEs as part of the system information (e.g. MIB) and a value range of the PUCCH Format is known to the UE. The PUCCH format is identified in the MAC-CE command 700 by the PUCCH-Format field 730. The PUCCH-Format field 730 is set equal to 4 in FIG. 7D. This value of 4 is an index value that corresponds to one or more specific parameters associated with the PUCCH format. The particular values in the fields for the MAC-CE 700 are not intended to be limiting, but are intended to show that the fields can include a value relevant to configuration information being provided in the MAC-CE command. FIG. 7D is a particular example of a MAC-CE command, but other examples of a MAC-CE command may include additional fields, the fields shown in FIG. 7D arranged in different order, and multiple instances of the same field.

In some embodiments, sets of parameters, such as those included in the MAC-CE command 700, each having particular values, may be conveyed by respective index values. This allows a compressed UL resource reconfiguration using a tabulated solution. An example of this is shown in FIG. 7E. A UL resource reconfiguration index value between 0 and 63 is associated with each set of parameters. Therefore, a discrete set of parameters can be provided to a UE based on, in this example, a 6 bit index value. The parameters in the table of FIG. 7E correspond to the parameters in the MAC-CE command 750 in FIG. 7D, with the addition of a PUCCH-NrOfSlots parameter, which designates the number of slots where the same PUCCH transmission is transmitted, on the table of FIG. 7E.

A particular UL resource reconfiguration index, in the example of FIG. 7E can be provided to the UE and parameter fields can be updated based on the parameter values associated with the UL resource reconfiguration index value.

Figure 7F:
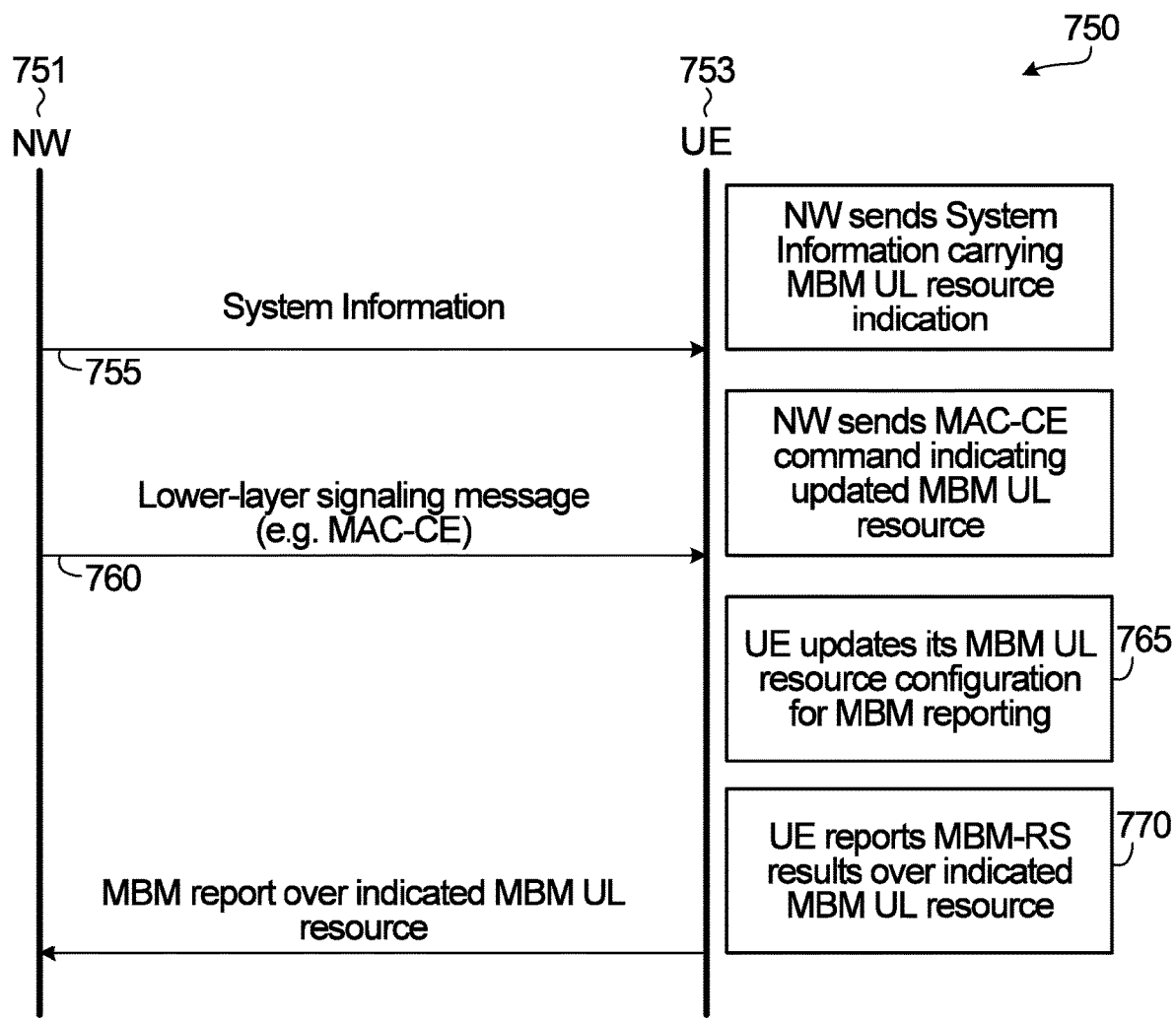
FIG. 7F is yet another flow diagram illustrating an example process of using L1/L2 signaling for enabling inter-cell mobility according to an aspect of the present disclosure.

FIG. 7F is an example signaling diagram 750 of signaling (i.e. messages) being exchanged between the network (indicated as NW in FIG. 7F) 751 and one UE 753 of one or more UEs being served by the network 751, as well as behavior in response to having received signaling (i.e. messages) from the network 751. The network 751 includes a serving cell that is serving one or more UEs, including the UE 753, and includes at least one neighbor cell of the serving cell. The serving cell may send higher layer and lower layer signaling higher (i.e. higher layer and lower layer messages)

to the UE 753. Both the serving cell and the neighbor cells can transmit mobility beam management reference signals to the UE 753.

The network 751 sends (i.e. transmits) 755 higher layer signaling (i.e. a higher layer message) to the UE 753, such as RRC signaling (i.e. an RRC message) with MBM-RS configuration information for the UE 753. The higher layer signaling (i.e. a higher layer message) may be Layer 3 signaling (i.e. a Layer 3 message). The network 751 sends 760 lower layer signaling (i.e. a lower layer message), in the form of L1 signaling (i.e. an L1 message) or L2 signaling (i.e. an L2 message), to the UE 753, such as a MAC-CE command (i.e. MAC-CE command 700) that includes additional configuration information in the form of MBM uplink resource reporting configuration information. The UE 753 may send (not shown) a MAC-CE acknowledgement to the network 751 indicating that the UE 753 has successfully received the MAC-CE command (i.e. MAC-CE command 700). The UE 753 updates 765 the MBM uplink resource reporting configuration based on the information in the MAC-CE command. The network 751 sends MBM-RS (not shown), which may be at least one of the serving cell sending MBM-RS and the neighbor cell sending MBM-RS. Based on the event configuration information, the UE 753 detects and measures the MBM-RS sent by the network 751. The UE 753 sends 770 an MBM report to the network on the uplink resource.

Another embodiment provided in this disclosure includes an aperiodic or semi-persistent based reporting of beam reference signal information.

Referring again to FIG. 1E to describe an example of this embodiment, the UE 97 is connected to serving gNB 91 and is moving along path 93. An assumption is made that the UE 97 is configured with knowledge of RS #1-4 from the serving gNB 91 and RS #1-4 from the neighbor gNB 96. Specifically, in this embodiment, the mobility beam management reference signals (MBM-RS) are radio resource management reference signals (RRM-RS) and not beam management reference signals (BM-RS).

As the UE 97 travels along the path 93, the UE 97 comes within the coverage area of different beams that are transmitted by the different gNBs 91, 96. Depending on the location of the UE 97 at a given time, the network can request the UE 97 to send an aperiodic/semi-persistent measurement report based on a particular mobility beam.

The network sends, via one of the gNBs, an aperiodic/semi-persistent MBM report request directly in a DCI format in a physical downlink control channel (PDCCH). The UE then detects and measures the indicated MBM-RS and transmits a MBM report to the network.

Network side behavior in this embodiment of mobility management involves the network, via one of the gNBs, sending a PDCCH transmission carrying the DCI format with an aperiodic/semi-persistent MBM report request, indicating the MBM-RS to be monitored for the report.

The UE behavior involves, based on the indicated MBM-RS in the received DCI, the UE detecting and measuring the MBM-RS, and transmitting a MBM report back to the network, via one of the gNBs.

Figure 8:
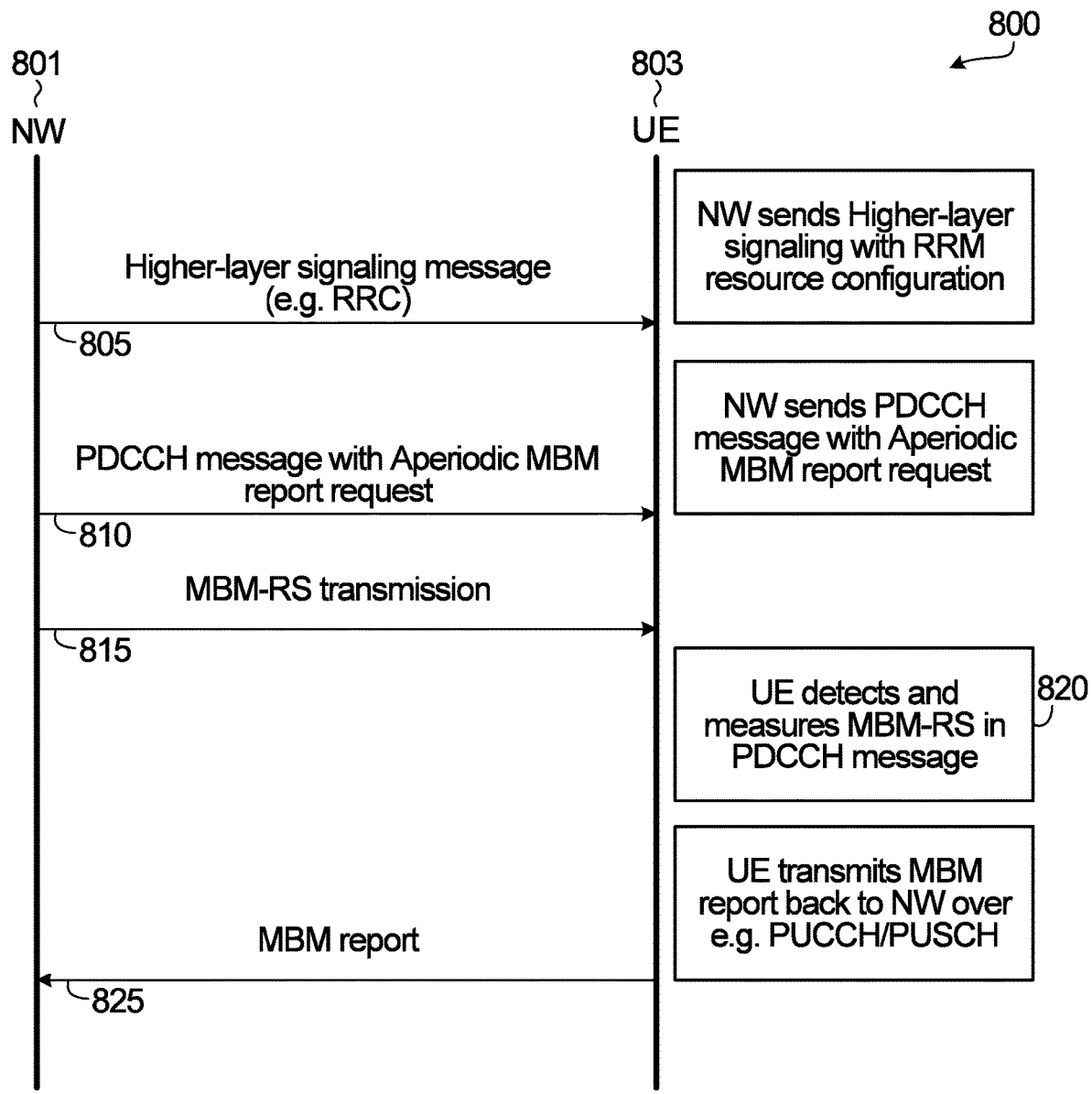
FIG. 8 another flow diagram illustrating an example process of using L1/L2 signaling for enabling an uplink transmission mechanism according to an aspect of the present disclosure.

FIG. 8 is an example signaling diagram 800 of the signaling (i.e. messages) being exchanged between the network (indicated as NW in FIG. 8) 801 and one UE 803 of one or more UEs being served by the network 801, as well as behavior in response to having received messages from the network 801. The network 801 includes multiple cells. As described with reference to FIG. 1E, from the perspective of a given UE, there is a serving cell that serves the UE and other cells, that are adjacent to the serving cell that are considered neighbor cells to the serving cell. The serving cell may send higher layer and lower layer signaling (i.e. higher layer and lower layer messages) to the UE. Both the serving cell and the neighbor cells can transmit mobility beam management reference signals to the UE 803.

The network 801 sends 805 higher-layer signaling (i.e. higher layer message) to the UE 803, such as RRC signaling (i.e. an RRC message) with RRM-RS configuration information for the UE. The higher layer signaling (i.e. higher layer message) may be a Layer 3 signaling (i.e. a Layer 3 message). The network 801 sends 810 a PDCCH message with an aperiodic MBM report request in a DCI. The network 801 here may be one or both of the serving cell and neighbor cell. The network 801 sends 815 a MBM-RS transmission to the UE 803. The UE 803 detects and measures 820 the MBM-RS transmission sent by the network 801 based on the content of the MBM-RS information in the PDCCH. The UE 801 sends 825 a MBM report back to the network over a designated channel, which could include a PUCCH or PUSCH.

Embodiments described above pertaining to aperiodic/semi-persistent reporting based on RRM-RS may enable efficient mobility management, as the network informs the UE about the specific RRM-RS that the network wants the UE to measure and report on.

Embodiments described above pertaining to aperiodic/semi-persistent reporting based on RRM-RS may result in low complexity UE behaviour. For example, the UE may only detect and measure the RRM-RS indicated in the aperiodic/semi-persistent report request with no processing power spent detecting or measuring RRM-RSs not indicated in the aperiodic/semi-persistent report request.

The following paragraphs include a description of an example of a beam-based mobility procedure that applies some of the embodiments described above used in combination, for example using mobility beam events, UL reporting of mobility beam events over a default UL physical channel, and DL MBM reference signal reconfiguration.

In describing an example of a process of mobility beam management, once again reference is made to FIG. 1E. The UE 97 is shown traveling along the path 93 and is in a location where it is considered within the coverage area of beam 90*d* of serving gNB 91 transmitting RS #4 and of beam 95*c* of neighbor gNB 96 transmitting RS #3, as explicitly shown in the FIG. 1E.

The UE is configured with a list of MBM-RSs as defined in the MBM-RS configuration information shown in FIG. 5A.

The UE is also configured with a mobility beam reporting event configuration. In some embodiments of such an implementation, an initial configuration of the mobility beam reporting event may not include information about the beams involved in the mobility beam event (i.e. resource1 and resource2 as identified in FIG. 5B). Therefore, the configuration of the mobility beam reporting event is similar to FIG. 5B, but does not include the CSI-RS-ResourceID or scramblingID information for either resource1 or resource2 shown in FIG. 5B.

When the UE 97 reaches the coverage area of the beam 90*d* transmitting RS #4 of the serving cell gNB 91 and the beam 95*c* transmitting RS #3 of the neighbor gNB 96, the network, via the serving gNB 91, sends lower layer signaling (i.e. a lower layer based message), to the UE 97, indicating to the UE 97 which mobility beam-based events the UE 97 is to track, which UL configuration to use for the purpose of MBM reporting and how to update its MBM-RS configuration. An example of the lower layer signaling (i.e. a lower layer based message) is L2-based signaling (i.e. an L2-based message). This lower layer signaling (i.e. lower layer message) can be a MAC-CE command. Such a MAC-CE command may include information from MAC-CE commands 550, 600, and 700 in FIG. 5C, FIG. 6A and FIG. 7D, respectively.

Figure 9A:
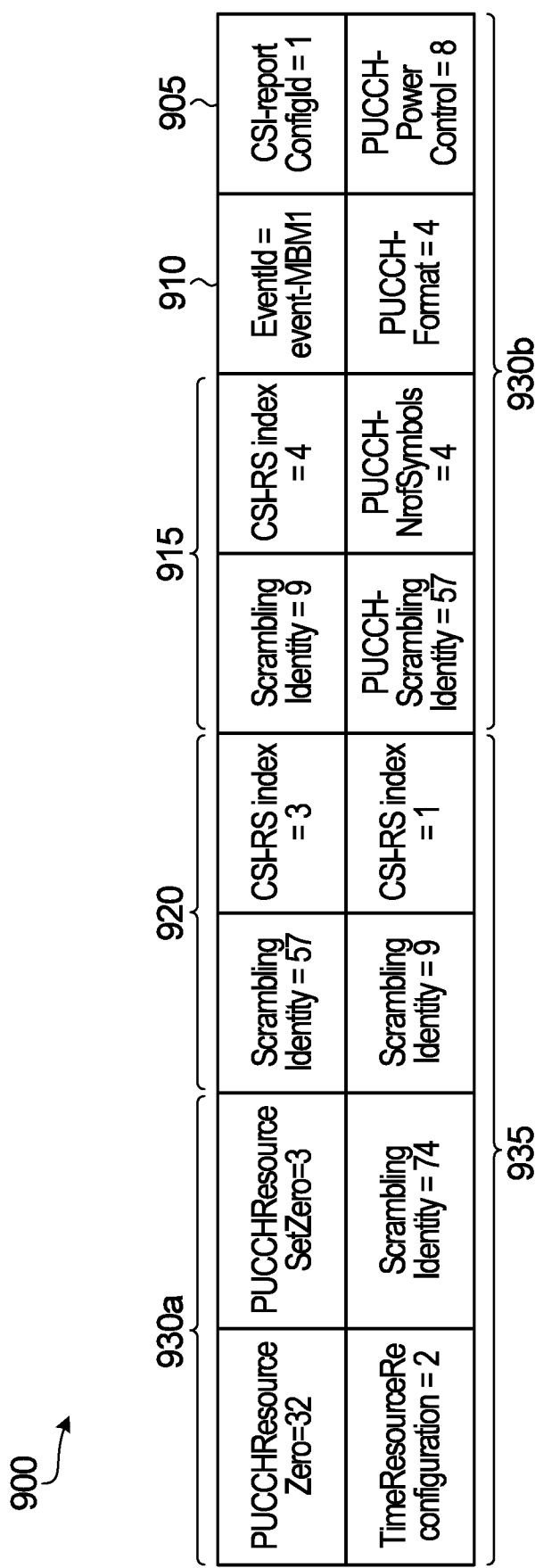
FIG. 9A is an example of a MAC-CE command for use in inter-cell mobility according to an aspect of the present disclosure.

An example of a MAC-CE command 900 format is shown in FIG. 9A. The MAC-CE command 900 contains information defining a reference signal report configuration 905 (CSI-report ConfigId), defines the parameters needed to configure an event, in particular defining particular beam reference signals using a respective reference signal index and scrambling identity, PUCCH resource information and information to reconfigure the scrambling identity of a reference signal for a particular beam.

The MAC-CE command format 900 enables the mobility beam-based event with the event identifier (EventId) "event-MBM1" 910 to be reconfigured such that resource1 uses RS #3 and resource2 uses RS #4.

The reference signal index (CSI-RS index) field and the scrambling identity (Scrambling Identity) field collectively defining resource1 are labelled 915 and the reference signal index field and scrambling identity field collectively defining resource2 are labelled 920.

The PUCCH configuration information is in the fields labelled with 930a and 930b. The fields of 930a include a PUCCH resource set #0 (PUCCHResourceSetZero) field and a PUCCH resource #0 (PUCCHResourceZero) field. The fields of 930b include a PUCCH power control (PUCCH-PowerControl) field, a PUCCH format (PUCCH-Format) field, and further fields, such as a number of PUCCH symbols (PUCCH-NrofSymbols) and a scrambling identity for the PUCCH (PUCCH-ScramblingIdentity), that are not shown, for example in FIG. 7D, for defining the number of symbols in the PUCCH used for beam management reporting and a scrambling index for the PUCCH used for beam management reporting.

Reconfiguration information for one of the reference signals is in the fields labelled 935. These fields labelled as 935 include a reference signal index (CSI-RS index) field and a current scrambling identity (Scrambling Identity) field that collectively define information for reference signal RS #1 and then a new scrambling identifier (Scrambling Identity) field to be used to replace the current scrambling identifier, as well as new time resource reconfigure information (TimeResourceReconfigure) field. The new time resource reconfigure information field may include information that corresponds to the TRR information listed in the table of FIG. 4D, for example.

In the event that the mobility beam-based event "event-MBM1" gets triggered, i.e. a threshold of one detected resource signal exceeds a second resource signal by a given threshold for a given duration, then the UE is to send a measurement report for "event-MBM1" on an UL PUCCH transmission configured for the UE based on the parameters indicated for the PUCCH transmission (e.g. PUCCHResourceSetZero, PUCCHResourceZero, PUCCH-PowerControl, PUCCH-Format, PUCCH-NrofSymbols, PUCCH-ScramblingIdentity).

In addition, the current RS #1 configured for the UE is reconfigured to a new RS #1 using a scrambling identity value of 74 (corresponding to a different neighbor base-station) instead of scrambling identity value of 9 and follows the timing configuration given by the row of FIG. 4D using the value of 2 (i.e. firstOFDMSymbolInTimeDomain is equal to 0, slot periodicity is 5 slots, slot offset is 0).

In this particular example, upon receiving a PDSCH transmission carrying the MAC-CE command 900, the UE sends an acknowledgement to confirm reception of the PDSCH to the network, via a gNB, and after a certain delay the UE applies the MAC-CE command (i.e. MCA-CE command 900). This allows the network to know when the MAC-CE command 900 has been applied by the UE. Based on the reconfiguration information in the MAC-CE command 900, the reconfigured mobility beam-based event has the contents as shown in FIG. 5D.

In this example, and once again referring to FIG. 1E, the UE 97 is now configured to track a mobility beam-based event where RS #4 of the serving cell gNB 91 is larger than RS #3 of the neighbor gNB 96, because the network is predicting that the UE 97 will leave the coverage area of the serving gNB 91 and move to the coverage area of the neighbor gNB 96. This prediction may be based on current trajectory information, location of gNB in the immediate area and other information available to the network. Furthermore, the network can collect measurements and reports from various UEs and build statistics using, for example: Artificial Intelligence, Machine Learning, Deep Learning modules to perform such predictions. Beams corresponding to RS #1-3 (beams 90a, 90b, 90c) on serving gNB 91 and RS #1-2 (beams 95a and 95b) on neighbor gNB 96 are irrelevant as far as the network is concerned as the network knows the beam arrangements used by the serving and neighbor gNBs.

As part of functionality involved in a mobility beam management process, a limited example of which was described above, the UE behavior may include some or all of the following functions:

1) the UE applies the contents of received higher layer signaling (i.e. a higher layer message), for example RRC signaling (i.e. an RRC message), received from a serving gNB carrying higher-layer configuration information such as MBM-RS configuration;
2) the UE performs MBM measurements on reference signals consistent with the configured MBM-RS;
3) the UE receives a lower layer signaling (i.e. a lower layer message) on a PDSCH, for example a MAC-CE command for Mobility Beam Management, carrying MBM-RS resource reconfiguration, MBM event reconfiguration and MBM UL PUCCH reconfiguration;
4) the UE sends a HARQ-ACK acknowledgement for the PDSCH carrying the lower layer signaling (i.e. a lower layer message) for mobility beam management;
5) the UE updates its internal MBM-RS configuration based on the information indicated in the lower layer signaling (i.e. a lower layer message) and starts tracking MBM-RSs indicated in the MBM event;
6) the UE detects and measures the indicated MBM event, and prepares an MBM report upon the MBM event getting triggered; and
7) the UE transmits the MBM report to the serving base station over the indicated MBM UL PUCCH resource indicated in the MAC-CE command.

Figure 9B:
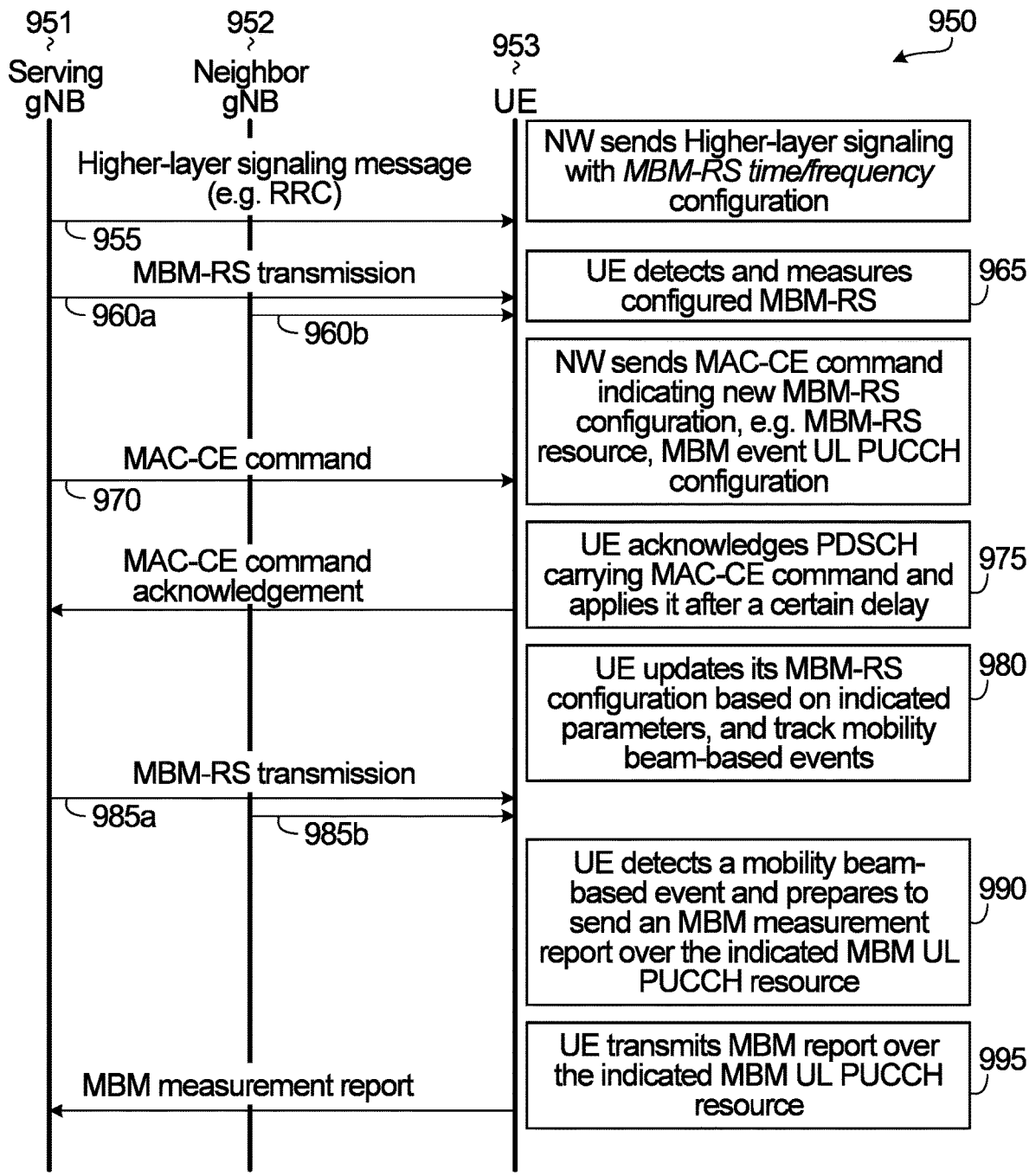
FIG. 9B is a flow diagram illustrating an example process of using L1/L2 signaling for enabling inter-cell mobility according to an aspect of the present disclosure.

FIG. 9B is an example signaling diagram 950 of the messages being exchanged between the network that includes a serving base station (Serving gNB) 951 that is serving one or more UEs and at least one neighbor base station (Neighbor gNB) 952 of the serving base station 952 and one UE 953 of one or more UEs being served by network, as well as behavior in response to having received messages from the network. The serving base station 951 sends 955 higher layer signaling (i.e. a higher layer message) to the UE 953, such as RRC signaling (i.e. an RRC message), with radio resource management reference signal (RRM-RS) configuration information for the UE 953. The higher layer signaling (i.e. a higher layer message) may be Layer 3 signal (i.e. a Layer 3 message). The serving base station 951 sends 960a a MBM-RS transmission and the neighbor cell 952 sends 960b a MBM-RS transmission. At step 965, the UE 953 detects and measures the MBM-RS identified in the configuration higher layer signaling (i.e. higher layer message 955. The serving base station 951 sends 970 the MAC-CE command, for example MAC-CE command 900 shown in FIG. 9A in a PDSCH. The UE 953 sends 975 an acknowledgement of receiving the PDSCH carrying the MAC-CE command (i.e. MAC-CE command 900). The UE 953 updates 980 the UE configuration based on configuration in the MAC-CE command. The serving base station 951 sends 985a more MBM-RS transmission and the neighbor base station 952 also sends 985b more MBM-RS transmission. At step 990, the UE 953 detects 990 a mobility based event (as described in one of the various ways above) and prepares to send an MBM measurement report over an UL resource configured in the MAC-CE command. The UE 953 sends 995 an MBM report back to the network over a designated channel, which could include a PUCCH or PUSCH.

This example shows how embodiments described in this disclosure aid in efficient mobility management, in that the network can inform the UE about the specific mobility beam-based events that the network is expecting reporting from the UE. The network, via the base stations, also provides UL configuration for the UE to use if the mobility beam-based event gets triggered, which reduces delay as the UE doesn't have to send mobility measurements over PUSCH transmissions.

This example shows how embodiments described in this disclosure aid in reduced complexity UE behavior. The UE only detects and measures the MBM-RS indicated in the mobility beam-based event. No processing power is spent detecting or measuring MBM-RSs not indicated in the MAC-CE command. The UL PUCCH resources indicated for MBM reporting allow the UE to directly transmit a mobility measurement in case the MBM event gets triggered.

This example shows how embodiments described in this disclosure aid in addressing a problem of tracking beam-based mobility events by providing the network with functionality to configure the UE with mobility beam-based events to track. The mobility beam-based events can be reconfigured on the fly using MAC-CE commands. Furthermore, this example illustrates a functionality to enable the UE to report mobility measurements for such mobility beam-based events without invoking higher-layer mechanisms (e.g. scheduling requests).

In the following paragraphs, another example of a beam-based mobility procedure is described that applies some of the embodiments from above when used in combination. The example describes using beam-set indication and ordering and UL reporting of mobility beam events over a default UL physical channel on an MBM BWP.

Once again referencing FIG. 1E, the UE 97 is shown traveling along the path 93 and is in a location where it is considered within the coverage area of beam 90d of serving gNB 91 transmitting RS #4 and of beam 95c of neighbor gNB 96 transmitting RS #3, as explicitly shown in the figure.

The UE is configured with a list of MBM-RSs as define in the MBM-RS configuration information shown in FIG. 5A.

The MBM-RSs that the UE 97 is configured to monitor are detected and measured by the UE 97 based on the timing configuration provided in FIG. 5A. In addition to the configuration information that is used to configure the UE in FIG. 5A, the network, via the base stations, provides all UEs within the network with MBM BWP information as part of basic system information (MIB).

FIG. 10A is an example of a portion of system information in the form of a configuration information element (IE) that may be broadcast by the network, via the serving cell and neighboring cells. The system information, as part of a mobility beam management configuration (ConfigMBM) includes information that identifies a mobility beam resource information as a collective set of parameters and identified by an associated index value, which is identified in FIG. 10A as MobilityBeamResourceSet, also referred to herein as MBRESET. The ConfigMBM and MobilityBeamResourceSet names are being used in this disclosure as an identification of the type of configuration being described, but it is to be understood that these names are not intended to limit the intended scope of the configuration information This configuration IE has a hierarchical structure like other IEs described above, for example FIGS. 7A and 7B.

Each mobility beam resource set (i.e. MobilityBeamResourceSet or MBRESET) has an associated index value for three parameters that define an UL BWP to be used for the purpose of MBM reporting, namely a number of resource block (RBs), a starting RB and a number of symbols. The MBRESET can be a system-wide parameter, i.e. all base stations use the same MBRESET, or it can be a cell-specific parameter, i.e. different base stations use their own MBRESET settings and values. In the scope of this example, it is assumed to be the former.

FIG. 10B is an example table that includes eight mobility beam resource sets identified with indices 0 to 7, respectively. The index value of MBRESET field points to an entry in the table, which further provides configuration about the time/frequency resources occupied by the MBM BWP, namely a Number of RBs, a Starting RB and a Number of symbols. Referring once again to FIG. 10A, based on the system information broadcast by the network, the UE uses a configuration matching with the row using MBRESET value of 7, namely a number of RBs equal to 48, a starting RB of 132 and a number of symbols equal to 4.

Based at least in part of the path 93 taken by the UE 97 in FIG. 1E, the network sends lower layer signaling (i.e. a lower layer message), for example L2-based signaling (i.e. an L2-based message), to the UE 97, indicating to the UE 97 a beam-set based on MBM-RS. The lower layer signaling (i.e. lower layer message) includes information about the MBM-RS that the UE 97 is expected to detect and measure, as well as the respective priorities of each MBM-RS. The lower layer signaling (i.e. lower layer message) also includes information about what configuration to use for the purpose of MBM reporting. This lower layer signaling (i.e. lower layer message) can be a MAC-CE command.

Figure 10C:
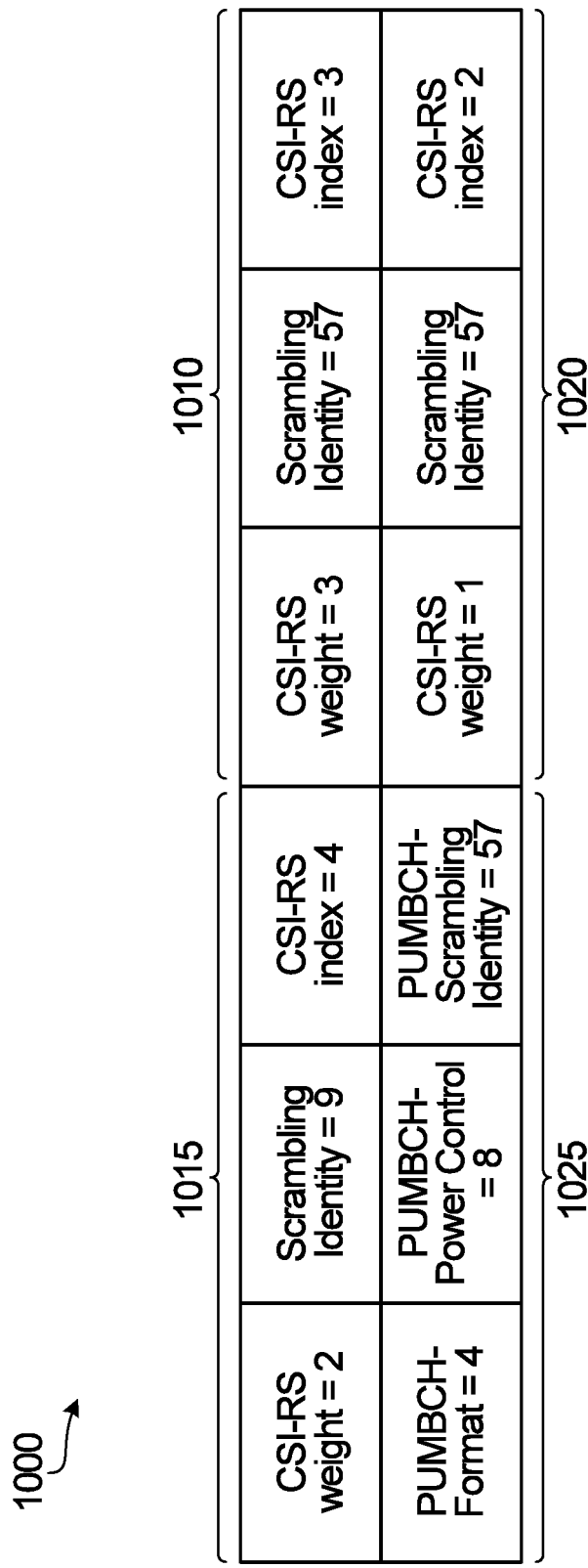
FIG. 10C is an example of a MAC-CE command for use in inter-cell mobility according to an aspect of the present disclosure.

FIG. 10C is an example of a MAC-CE command 1000 including the various fields that may be included in such a MAC-CE command. The MAC-CE command 1000 contains information defining the MBM beam-set that the UE is expected to detect and measure, in particular defining particular beam reference signals using a respective reference signal index (CSI-RS index), scrambling identity (Scrambling Identify) and reference signal weight value (CSI-RS weight), and resource information that can be used by the UE to report beam information the to the network (PUMBCH-Scrambling Identity, PUMBCH-Power Control, and PUMBCH-Format). In some embodiments, the UE is not expected to detect and measure MBM-RSs that were configured by the network using higher layer signaling, but that are not part of the indicated MBM beam-set.

Three sets of fields 1010, 1015 and 1020 are included in the MAC-CE command 1000. Each set of information includes the reference signal index field (CSI-RS Index), the scrambling identity field (Scrambling Identity) and the reference signal weight value (CSI-RS weight) that collectively define a respective beam. The weight associated with an MBM-RS is information the UE uses in RS detection. As an example, for an MBM-RS assigned a weight of n, the UE applies a threshold of 1/(n+1) on the conditional probability P{y|x=MBM-RS} that the received signal (y) was sent assuming the MBM-RS was indeed the transmitted signal (x).

A set of three additional fields collectively labelled 1025 in the MAC-CE 1000 includes resource information that can be used by the UE to report beam information to the network. The resource is identified as a physical uplink mobility beam channel (PUMBCH), however this label is simply being used as a descriptive term. The resource may also be a more typical uplink channel such as a PUCCH or a PUSCH. In this example, the three fields 1025 include a PUMBCH-ScramblingIdentity field to be used to configure the scrambling identity for the demodulation reference signal (DMRS) of the PUMBCH, a PUMBCH-Power Control field to configure the power on the PUMBCH and a PUMBCH-Format field to configure the format used on the PUMBCH.

As part of functionality involved in a mobility beam management process, a limited example of which was described above, the UE behavior may include some or all of the following functions:

1) the UE applies RRC signaling (i.e. an RRC message) received from the network, via the base stations, carrying higher layer configuration information such as MBM-RS configuration;
2) the UE receives a MAC-CE command (for example MAC-CE command 1000 in FIG. 10C) on a PDSCH for Mobility Beam Management, carrying MBM beam-set including MBM-RS indexes, MBM-RS scrambling identities, MBM-RS weights, and UL resources for the transmission of the physical uplink mobility beam channel;
3) the UE sends a HARQ-ACK acknowledgement for the PDSCH carrying the MAC-CE command (for example MAC-CE command 1000 in FIG. 10C) for mobility beam management;
4) the UE updates its internal RS detection algorithm and starts applying RS detectability rules based on the information indicated in the MAC-CE command (for example MAC-CE command 1000 in FIG. 10C);
5) the UE detects and measures the indicated MBM-RS, based on the weights of each MBM-RS in the indicated beam-set; and
6) the UE transmits the MBM report to the serving base station (gNB) over the indicated PUMBCH resource (or other configured UL channel) indicated in the MAC-CE command.

Figure 10D:
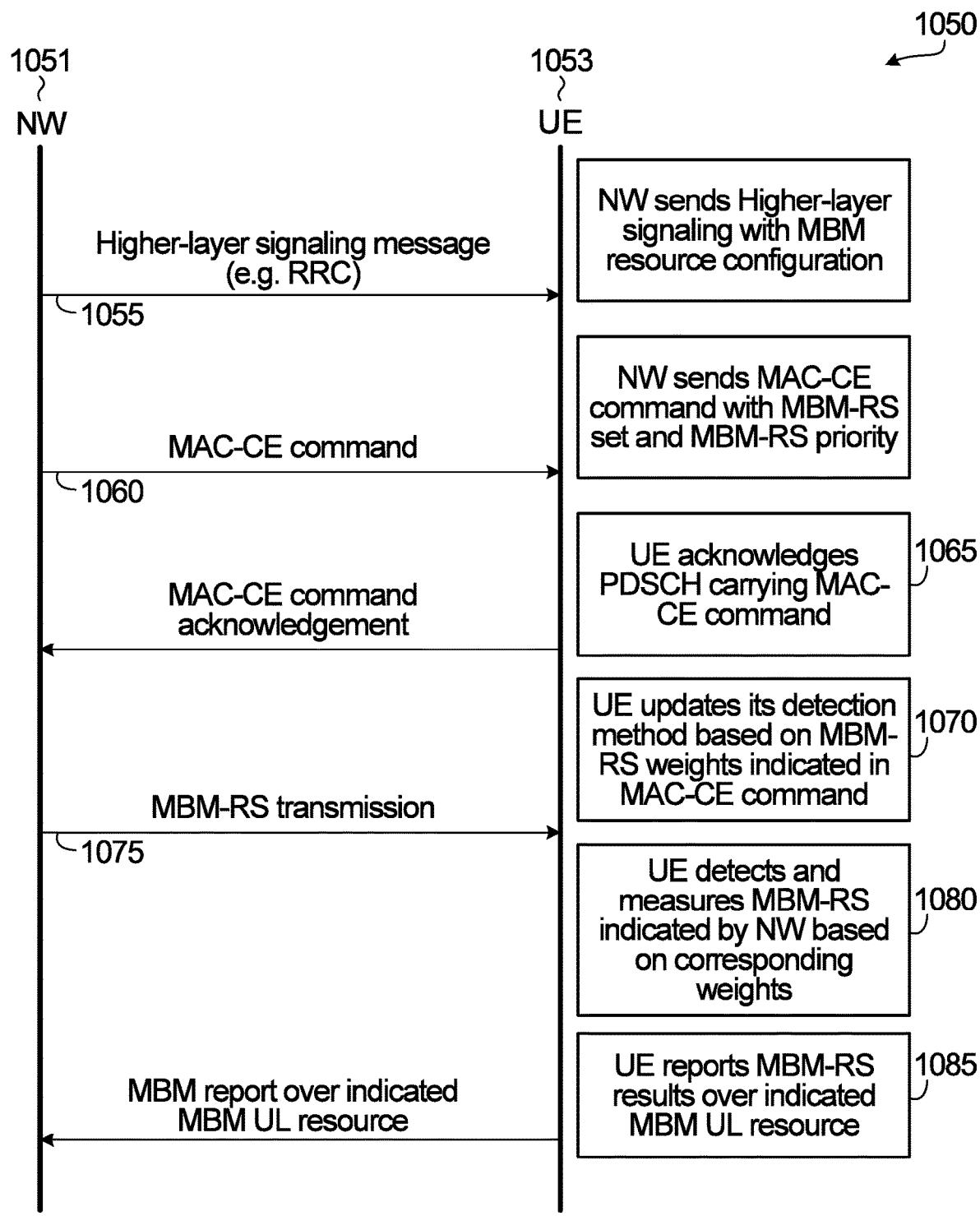
FIG. 10D is a flow diagram illustrating an example process of using L1/L2 signaling for enabling inter-cell mobility according to an aspect of the present disclosure.

FIG. 10D is an example signaling diagram 1050 of the messages being exchanged between the network 1051 (indicated as NW in FIG. 8) and one UE 1053 of one or more UEs being served by network 1051, as well as behavior in response to having received messages from the network 1051. The network 1051 includes a serving base station that is serving one or more UEs and at least one neighbor base station of the serving base station. The network 1051 as represented in FIG. 10D may therefore be transmitting signaling either via the serving base station or a neighbor base station to the UE 1053 or receiving a message from the UE 1053. The network 1051 sends 1055 higher layer signaling (i.e. a higher layer message) to the UE 1053, such as RRC signaling (i.e. an RRC message), with radio resource management reference signal (RRM-RS) configuration information for the UE 1053. The higher layer signaling (i.e. a higher layer message) may be Layer 3 signaling (i.e. a Layer 3 message). The network 1051 sends 1060 the MAC-CE command, for example MAC-CE command 1000 shown in FIG. 10C in a PDSCH. The UE 1053 sends 1065 an acknowledgement of receiving the PDSCH carrying the MAC-CE command. The UE 1053 updates 1070 the UE configuration based on configuration in the MAC-CE command. The network 1051 sends 1075 MBM-RS transmission, which may include the serving base station or one or more neighbor base stations sending MBM-RS transmissions. At step 1080, the UE 1053 detects a mobility based event (as described in one of the various ways above) and prepares to send an MBM measurement report over an UL resource configured in the MAC-CE command. The UE 1053 sends 1085 a MBM report back to the network, via the serving base station or one or more neighbor base stations, over a designated channel, which could include a PUCCH or PUSCH.

This example of signaling in FIG. 10D shows how embodiments described in this disclosure aid in efficient mobility management, in that the network can inform the UE about the specific mobility beam-based event that the network is expecting reporting from the UE. The network, serving base station or one or more neighbor base stations, also provides UL configuration for the UE to use if the mobility beam-based event gets triggered, which reduces delay as the UE doesn't have to send mobility measurements over PUSCH transmissions.

This example of signaling in FIG. 10D shows how embodiments described in this disclosure aid in reduced complexity UE behavior. The UE only detects and measures the MBM-RS indicated in the mobility beam-based event. No processing power is spent detecting or measuring MBM-RSs not indicated in the MAC-CE command (i.e. MAC-CE command 1000). The UL PUMBCH resources indicated for MBM reporting allow the UE to directly transmit mobility measurements based on the MBM-RS in the mobility beam-set.

This example of signaling in FIG. 10D shows how embodiments described in this disclosure aid in addressing a problem of tracking beam-based mobility events by providing the network with the means to configure the UE to detect and measure only a certain set of MBM-RSs. Those mobility beam-sets can be reconfigured on the fly using MAC-CE commands MAC-CE command 1000. Furthermore, this example provides the UE with the means to report mobility measurements for such mobility beam-based events without invoking higher-layer mechanisms (e.g. scheduling requests).

It should be noted that the example described above with reference to FIG. 10D assumes a cell-agnostic or cell-transparent design in the signaling flow. The UE is only aware of reference signals for the purpose of mobility beam management and the reporting of mobility beam measurements is done over a channel that is not specifically aimed at the serving base station.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method for performing inter-cell mobility management comprising:
   receiving, by a user equipment (UE) from a network, higher-layer signaling comprising configuration information for a plurality of mobility beam management reference signals (MBM-RSs) enabling the UE to measure MBM-RSs transmitted by at least one serving base station and at least one neighbor base station in the network; and
   receiving, by the UE from the network, lower-layer signaling comprising additional configuration information relating to monitoring for a mobility beam management (MBM) event;
   wherein the additional configuration information comprises information about a MBM-RS to be monitored for a MBM event, the MBM-RS being one of the plurality of MBM-RSs for which the configuration information is received, the information comprising time-frequency resource information and a scrambling identifier.

2. The method of claim 1, wherein the lower-layer signaling comprises at least one of a Layer 1 (L1) or a Layer 2 (L2) signaling.

3. The method of claim 1, wherein the additional configuration information further comprises an identification of the MBM event based on a type of measurement related to the MBM event to be monitored, a threshold value for the MBM event, and a duration related to the threshold value that when exceeded triggers the MBM event.

4. The method of claim 1, wherein the time-frequency resource information identifies one or more of periodicity, offset and resource mapping for the MBM-RS.

5. The method of claim 1, wherein the time-frequency resource information comprises at least one of:
   an index value associated with one or more time domain resource configuration parameter for the MBM-RS; or
   an index value associated with one or more frequency domain resource configuration parameter for the MBM-RS.

6. The method of claim 1, further comprising measuring the MBM-RS to be monitored for the MBM event thereby generating measurement information for the MBM-RS being monitored.

7. The method of claim 6, wherein the additional configuration information comprises uplink resource configuration information that identifies an uplink resource to be used by the UE to report the measurement information for the MBM-RS being monitored.

8. The method of claim 7, wherein the uplink resource configuration information comprises an index value associated with one or more uplink resource configuration parameters.

9. The method of claim 6, further comprising:
   sending, by the UE to the network, the measurement information for the MBM-RS.

10. The method of claim 1, wherein the additional configuration information comprises information for a set of the plurality of MBM-RSs, which comprises a weight value to each MBM-RS of the set of MBM-RSs, the weight values used by the UE to determine an order of monitoring the MBM-RSs of the set of MBM-RSs.

11. A method for performing inter-cell mobility management comprising:
   transmitting, by a network to a user equipment (UE), higher-layer signaling comprising configuration information for a plurality of mobility beam management reference signals (MBM-RSs) enabling the UE to measure MBM-RSs transmitted by at least one serving base station and at least one neighbor base station in the network; and
   transmitting, by the network to the UE, lower-layer signaling comprising additional configuration information relating to a mobility beam management (MBM) event;
   wherein the additional configuration information comprises information about a MBM-RS to be monitored for a MBM event, the MBM-RS being one of the plurality of MBM-RSs for which the configuration information is provided, the information comprising time-frequency resource information and a scrambling identifier.

12. The method of claim 11, wherein the lower-layer signaling comprises at least one of a Layer 1 (L1) or a Layer 2 (L2) signaling.

13. The method of claim 11, wherein the additional configuration information comprises an identification of the MBM event based on a type of measurement related to the MBM event, a threshold value for the MBM event, and a duration related to the threshold value that when exceeded triggers the MBM event.

14. The method of claim 11, wherein the time-frequency resource information identifies one or more of periodicity, offset and resource mapping for the MBM-RS.

15. The method of claim 11, wherein the additional configuration information comprises information for a set of the plurality of MBM-RSs, which comprises a weight value to each MBM-RS of the set of MBM-RSs, the weight values used by the UE to determine an order of monitoring the MBM-RSs of the set of MBM-RSs.

16. An apparatus comprising at least one processor coupled with a non-transitory computer-readable storage medium storing instructions, the instructions when executed by the at least one processor cause the apparatus to:

receive from a network, higher-layer signaling comprising configuration information for a plurality of mobility beam management reference signals (MBM-RSs) enabling the apparatus to measure MBM-RSs transmitted by at least one serving base station and at least one neighbor base station in the network; and receive from the network, lower-layer signaling comprising additional configuration information relating to monitoring for a mobility beam management (MBM) event;

wherein the additional configuration information comprises information about a MBM-RS to be monitored for a MBM event, the MBM-RS being one of the plurality of MBM-RSs for which the configuration information is received, the information comprising time-frequency resource information and a scrambling identifier.

17. The apparatus of claim 16, wherein the additional configuration information further comprises an identification of the MBM event based on a type of measurement related to the MBM event to be monitored, a threshold value for the MBM event, and a duration related to the threshold value that when exceeded triggers the MBM event.

18. The apparatus of claim 16, wherein the additional configuration information comprises uplink resource configuration information that identifies an uplink resource to be used by the apparatus to report the measurement information for the MBM-RS being monitored.

19. An apparatus comprising at least one processor coupled with a non-transitory computer-readable storage medium storing instructions, the instructions when executed by the at least one processor cause the apparatus to:

transmit, to a user equipment (UE), higher-layer signaling comprising configuration information for a plurality of mobility beam management reference signals (MBM-RSs) enabling the UE to measure MBM-RSs transmitted by at least one serving base station and at least one neighbor base station in the network; and transmit to the UE, lower-layer signaling comprising additional configuration information relating to monitoring for a mobility beam management (MBM) event;

wherein the additional configuration information comprises information about a MBM-RS to be monitored for a MBM event, the MBM-RS being one of the plurality of MBM-RSs for which the configuration information is provided, the information comprising time-frequency resource information and a scrambling identifier.

20. The apparatus of claim 19, wherein the additional configuration information further comprises an identification of the MBM event based on a type of measurement related to the MBM event to be monitored, a threshold value for the MBM event, and a duration related to the threshold value that when exceeded triggers the MBM event.

* * * * *